United States Patent [19]

Massey et al.

[11] Patent Number: 4,567,600
[45] Date of Patent: Jan. 28, 1986

[54] METHOD AND APPARATUS FOR MAINTAINING THE PRIVACY OF DIGITAL MESSAGES CONVEYED BY PUBLIC TRANSMISSION

[75] Inventors: James L. Massey, Zurich, Switzerland; Jimmy K. Omura, Culver City, Calif.

[73] Assignee: Omnet Associates, Sunnyvale, Calif.

[21] Appl. No.: 418,038

[22] Filed: Sep. 14, 1982

[30] Foreign Application Priority Data

Feb. 2, 1982 [EP] European Pat. Off. ........ 82100739.0

[51] Int. Cl.$^4$ .............................................. H04L 9/04
[52] U.S. Cl. .................... 375/2.1; 178/22.09; 178/22.11; 178/22.14; 178/22.15
[58] Field of Search ................. 178/22.09, 22.1, 22.11, 178/22.14, 22.15, 22.16; 375/2.1

[56] References Cited

U.S. PATENT DOCUMENTS

| 3,798,605 | 3/1974 | Feistel | 178/22.09 |
|---|---|---|---|
| 4,165,444 | 8/1979 | Gordon | 178/22.14 |
| 4,200,770 | 4/1980 | Hellman et al. | 178/22.11 |
| 4,208,739 | 6/1980 | Lu et al. | 178/22.1 |
| 4,218,582 | 8/1980 | Hellman et al. | 178/22.11 |
| 4,399,323 | 8/1983 | Henry | 178/22.14 |
| 4,417,338 | 11/1983 | Davida | 178/22.09 |
| 4,424,414 | 1/1984 | Hellmann et al. | 178/22.11 |

OTHER PUBLICATIONS

Data Encryption with Public Key Distribution, by Brian P. Schanning, 1979 IEEE, pp. 653–660.
Communications Privacy: Integration of Public and Secret Key Cryptography, by Kowalchuk, Schanning & Powers, 11/30/80 IEEE, pp. 49.1.1–49.1.5.
Distributed Management System of Cryptographic Keys in Communication Networks, by Okamoto, et al., 1981, pp. 421–429.
A Subexponential Algorithm for the Discrete Logarithm Problem, by L. Adllman, 1979 IEEE FOCS; pp. 55–60.
Letter by Berkovits, et al., May 1979 issue of IEEE Communications Magazine, pp. 2, 3.
The Use of Public Key Cryptography in Communication System Design, by Adelman and Rivest, pp. 20–23.
An Overview of Public Key Cryptography by Hellman, pp. 24–32, IEEE Communications Society Magazine, Nov. 1978.
Cryptography a Primer, by Alan G. Konheim, 1981, pp. 345, 346.
New Directions in Cryptography, by Diffie and Hellman, pp. 644–654, IEEE Transactions on Information Theory, vol. IT-22, No. 6, 11/76.
An Improved Algorithm for Computing Logarithms over GF(p) and its Cryptographic Significance, by Pohling and Hellman, IEEE Transactions on Information Theory, vol. IT-24, No. 1, Jan. 1978.

*Primary Examiner*—Salvatore Cangialosi
*Attorney, Agent, or Firm*—Kenyon & Kenyon

[57] ABSTRACT

A private message of m bits is conveyed from its sender to its receiver by transmission of a public message of m bits, transmission of a public reply of m bits, and another transmission of a public message of m bits such that only the intended receiver can easily recover the private message from the three public messages. This private message now available to both the sender and intended receiver also allows all subsequent private messages between these two points to require only one public message for each private message while maintaining the property that only the intended receiver of each message can easily recover the private message for each public message.

26 Claims, 10 Drawing Figures

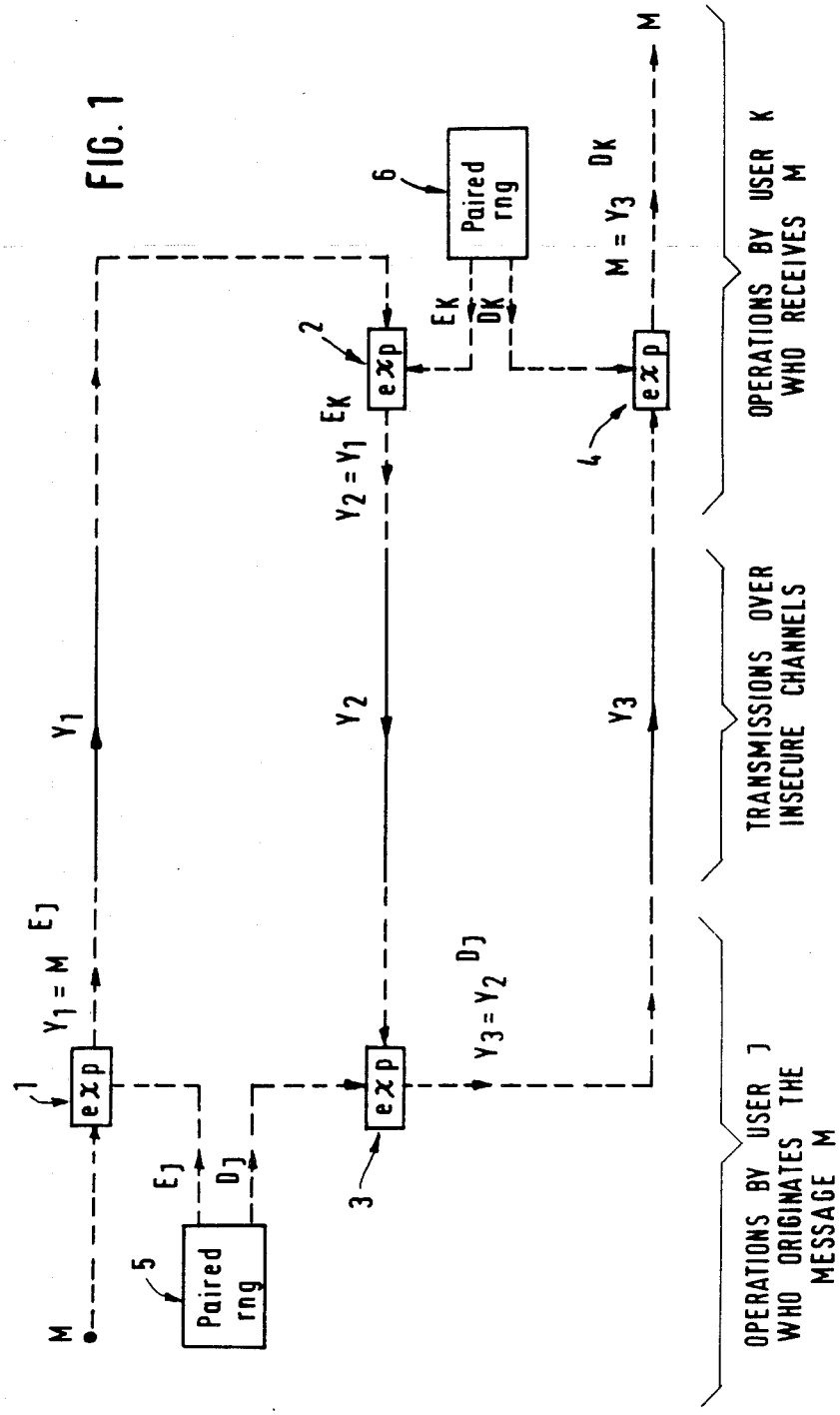

METHOD AND APPARATUS FOR MAINTAINING THE PRIVACY OF DIGITAL MESSAGES CONVEYED BY PUBLIC TRANSMISSION

BACKGROUND OF THE INVENTION

The present invention relates to the encryption of digital messages so as to maintain privacy of their contents when the resulting encrypted messages are transmitted over insecure channels, i.e., in such a way as to be subject to interception by unauthorized parties. The need for practical means to maintain privacy of digital messages has become urgent in the wake of the rapid expansion of digital networks in which a wide variety of users share the same communications resources whose transmissions must be considered subject to unauthorized interception. The messages that must be effectively transmitted through such a network may include banking data, medical data, personnel files, electronic mail, documents, images for teleconferencing, credit information and similar material whose sensitivity demands that it be kept private.

The conventional cryptographic solution to the problem of maintaining the privacy of a digital message requires the prior possession of a common secret key, used to both encrypt and decrypt messages, by those parties who wish to exchange private messages among them. The paper "Communication Theory of Secrecy Systems" by C. E. Shannon, Bell System Tech. J., Vol. 28, pp. 656–715, October 1949, gives a summary of this conventional cryptographic approach and shows that perfect privacy can be achieved only when there are at least as many binary digits of secret key as there are bits of information in all the private messages that will be coded before the secret key is again changed. The secret key must of course be distributed to the authorized parties by some means not subject to unauthorized interception, for instance by certified couriers. The practical difficulties of generating, distributing and safeguarding large amounts of secret key render conventional cryptographic techniques of doubtful practical value as means for maintaining privacy of messages in large digital networks.

In the paper "New Directions in Cryptography" by W. Diffie and M. E. Hellman, IEEE Trans. Info. Th., Vol. IT-22, pp. 644–654, November 1976, alternative cryptographic approaches were proposed to eliminate the need to exchange secret keys. These approaches rely for their security entirely on the computational difficulty of the task that a cryptanalyst must perform in order to determine the private messages from their coded versions. These approaches, in contrast to the prior exchange of secret keys, require the prior exchange of public keys, that is, keys whose identity need not be kept secret but which must be available to any two users who wish to send secret messages between them. The public key is utilized in encrypting the message. A private key, known only to the receiver, and which is related to the public key in a manner which makes it determination mathematically difficult, is then utilized to decrypt the public message. One object of the invention is to provide a technique for maintaining privacy of digital messages that requires no prior distribution of any key, whether public or private.

SUMMARY OF THE INVENTION

The explanation of the invention utilizes both the basic terminology and properties of finite fields, particularly that of $GF(2^m)$, which may be found in textbooks on algebra as well as in "The Theory of Error-Correcting Codes" by F. J. MacWilliams and N. J. A. Sloane, North-Holland Publishing Co., 1977, and also the basic terminology and properties of modular arithmetic which may be found in textbooks on digital computation such as "Digital Networks and Computer Systems", by T. L. Booth, John Wiley and Sons, 1971.

The finite field $GF(2^m)$ is a number system containing $2^m$ different elements that can be added and multiplied using the same commutative, associative and distributive laws that apply for the real numbers. The attractiveness of $GF(2^m)$ in practical applications stems from the fact that each of its elements can be represented as a vector of m binary components. The element B of $GF(2^m)$ is said to be a primitive element when the elements $B^N$ for $N = 0, 1, \ldots, 2^m - 2$ are all distinct. In this case, one can write any non-zero element C of $GF(2^m)$ as $$C = B^N$$

where N is an integer between 0 and $2^m - 2$ inclusive. It is customary, in analogy with the usage for real numbers, to call such integer N the "logarithm" of C to the base B, and to write $$N = \log_B C.$$

The process of forming C from B and N is called "exponentiation"; the inverse operation of finding N from B and C is called "taking the logarithm".

It was pointed out by Diffie and Hellman in the aforementioned paper that exponentiation in $GF(2^m)$ is relatively much easier to perform, requiring more than m and at most 2 m multiplications in $GF(2^m)$, than taking the logarithm, which requires about $2^{m/2}$ operations in $GF(2^m)$ for the best of the known algorithms that apply for all values of m. One object of the invention is to provide new and improved means for exponentiation in $GF(2^m)$ that utilizes only m multiplications in $GF(2^m)$.

For large m, it appears virtually impossible to take logarithms in $GF(2^m)$. For instance with $m = 127$, about $10^{19}$ operations in $GF(2^m)$ would be required. This is equivalent to about 400,000 years of computation on an ultra-fast computer that could perform a multiplication in $GF(2^{127})$ in only one microsecond. In the letter "Implementing Public Key Scheme" by S. Berkovits, J. Kowalchuk and B. Schanning, IEEE Communications Magazine, Vol. 17, pp. 2–3, May, 1979, this difficulty of taking logarithms in $GF(2^{127})$ was exploited to provide a cryptographic technique that allows two users with prior knowledge of one another's public keys to form a common secret key. One object of the invention is to exploit the difficulty of taking logarithms in $GF(2^m)$ to provide privacy for digital messages in a way that requires no prior knowledge of any keys.

The invention lies in the recognition that if a private meassage is hidden within a public message by some transformation such that it is virtually impossible for another party to undo this transformation to obtain the private message, nonetheless that transformation can easily be undone by the party who applied the transformation.

This suggests, according to the invention, that to provide privacy for a digital message, three encrytped versions of the message should be transmitted for each private message. The sender S encrypts the private message using a first personal encrypting transformation, which is then transmitted via the insecure public channel. The receiver R then encrypts the encrypted message a second time using another different personal encrypting transformation. This second message is then returned to the original sender S via the channel, allowing the original sender S to remove the first transformation from the message. The message is now encrypted only by the transformation that the original receiver R applied to form the second encrypted message. Thus, if the sender S now transmits this message once more to the receiver R, the receiver can then undo his personal transformation to obtain the original private message. This concept of utilizing three public messages to transmit one private message was discussed in "Cryptography-A Primer," by Allen G. Konheim, pp. 345-46, John Wiley & Sons, 1981, in which the encryption-decryption transformations are based on the field GF(p), where p is a prime number, instead of the field $GF(2^m)$.

Another object of the invention is to allow the users who have conveyed a private message by the use of three public messages to then continue to exchange further private messages by the transmission of only one public message for each private message.

The invention utilizes pairs of random numbers which are mathematically related in such a way that the product of the two numbers equals 1 modulo $2^m-1$. Accordingly, another object of the invention is to provide a new and improved means for generating random pairs of integers whose product is 1 modulo $2^m-1$.

Additional objects and features of the invention will appear from the following description in which the preferred embodiments have been set forth in detail in connection with the accompanying drawings.

BRIEF DESCRIPTION OF THE DRAWINGS

FIG. 1 is a functional flow diagram that illustrates how a private message is conveyed to its destination by the transmission of three public messages.

FIG. 2b is the block diagram of a device for performing exponentiation in the finite field $GF(2^7)$ in parallel form.

DETAILED DESCRIPTION

Figure 1A:
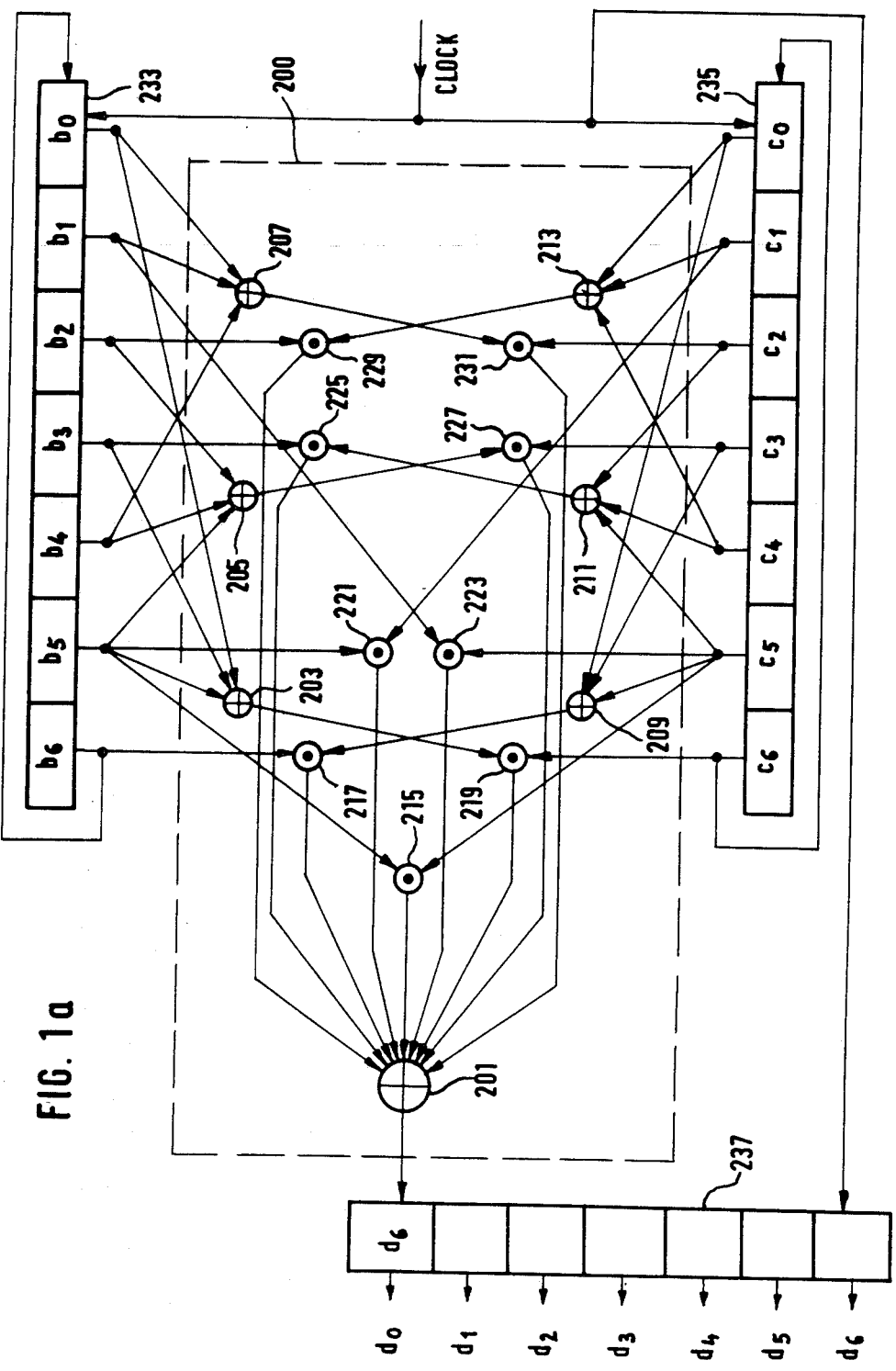
FIG. 1a is a block-logic diagram of a multiplier for $GF(2^7)$ that sequentially computes each binary component of the product.

Suppose that in an insecure digital data network, User J wishes to send a private message M to User K. By "insecure", it is meant here that transmissions over the channels of the network may be intercepted by parties other than the ones to whom they are addressed, but it is assumed that only authorized senders can originate messages so that the "header" attached to a message will correctly identify its origin. Thus, the recipient (whether authorized or not) of a message will know who was the originator of the message. A functional flow diagram of the manner in which such a single private message may be sent from User J to User K according to the invention by the exchange of three public messages is shown in FIG. 1.

Blocks 1, 2, 3 and 4 in FIG. 1 are labelled "exp" to indicate that at these points in the signalling process an exponentiation operation in the finite field $GF(2^m)$ will be performed. Blocks 5 and 6 are labelled "Paired rng" to indicate that, at these points in the signalling process, a special type of random number generator will be called upon to produce a pair of integers, each of whose values will lie somewhere between 1 and $2^m-2$ inclusive. A complete specification of this pair of random numbers will be given later.

The private message M which User J wishes to send to User K is allowed to be any element of $GF(2^m)$ except the elements 0 and 1. This message will be represented by m binary digits in the manner $$M=[b_{m-1}, b_{m-2}, \ldots, b_1, b_0]$$

where $b_{m-1}$ is the first bit of the message, $b_{m-2}$ is the second bit, etc. The condition $M\neq 0$ means that all m of these binary digits cannot be zeroes. The condition that $M\neq 1$ means, in the preferred representation of $GF(2^m)$ by a normal basis as explained in applicants' U.S. application entitled Computational Method and Apparatus for Finite Field Arithmetic which was earlier filed in the European Patent Office on Nov. 30, 1981 as application Ser. No. 81110018.9, the disclosure of which is hereby incorporated by reference, that all m of the binary digits cannot be ones. With only these two exceptions, the message M can be any message written as m binary digits.

The representation of the elements of $GF(2^m)$ by a normal basis is unconventional, but results in much simpler logic circuitry necessary to implement the invention than would be required if conventional representations of the elements of $GF(2^m)$ were utilized. In particular, the design of apparatus which performs exponentiation is significantly simplified, and the efficiency of such apparatus is increased.

For the finite field $GF(2^m)$, there always exists a normal basis, that is, one can always find a field element A such that $A, A^2, A^4, \ldots, A^{2^m}$ are a basis for $GF(2^m)$ in the sense that every field element B can be uniquely written as $$B=b_{m-1}A^{2^{m-1}}+b_{m-2}A^{2^{m-2}}+\ldots$$
$$b_2A^4+b_1A^2+b_0A=[b_{m-1}, b_{m-2}, \ldots, b_2, b_1, b_0]$$

where $b_{m-1}, b_{m-2}, \ldots b_2, b_1, b_0$ are binary digits. When the elements of $GF(2^m)$ are so represented, then the logic circuitry required to implement both multiplication and squaring, two operations useful in exponentiation, are greatly simplified.

According to the invention, both User J and User K will possess special random number generators that can be called upon to produce a pair of integers, each of which will be approximately equally likely to be any number between 1 and $2^m-2$ inclusive, but each of which determines the other in a manner that will be explained later.

As soon as User J has a private message M to send, User J calls upon his special random number generator to produce the pair of integers $E_J$ and $D_J$ as indicated by block 5 in FIG. 1. He then uses the first of these two integers to perform the exponentiation indicated by block 1 in FIG. 1 in order to calculate the element $$Y_1 = M^{E_J} \quad (1)$$

of $GF(2^m)$, which is the first encipherment of the private message M and is another vector of m binary digits. User J next sends $Y_1$ to User K over the insecure transmission channels of the network as shown in FIG. 1.

Upon receipt of the public message $Y_1$, whose header will identify it as originating from User J and addressed to User K, User K calls upon his special random number generator to produce the pair of integers $E_K$ and $D_K$ as indicated by block 6 in FIG. 1. User K then uses $E_K$ to perform the exponentiation indicated by block 2 in FIG. 1 in order to calculate the element $$Y_2 = Y_1^{E_K} \quad (2)$$

of $GF(2^m)$, which can be considered a second encipherment of the private message M and is another vector of m binary digits. From equations (1) and (2) it follows that $$Y_2 = M^{E_J E_K} = (M^{E_K})^{E_J} \quad (3)$$

User K then sends the public message $Y_2$ back to User J over the insecure transmission channels of the network as shown in FIG. 1. The header attached to the public message $Y_2$ identify it as coming from User K and addressed to User J.

Recall that User J has not yet made use of the second integer $D_J$ that he obtained earlier from his special random number generator. As will be explained more full later, this integer $D_J$ is that integer between 1 and $2^m-2$ inclusive with the property that the product $$E_J D_J = 1 \pmod{2^m - 1} \quad (4)$$

Equation (4) means that the product of the integers on the left has a remainder of 1 when divided by $2^m-1$ or, equivalently, that $$E_J D_J = Q(2^m - 1) + 1 \quad (5)$$

for some integer Q. Thus, when User J receives the public message $Y_2$, he can perform the exponentiation indicated by block 3 in FIG. 1 to obtain the element $$Y_3 = Y_2^{D_J} \quad (6)$$

of $GF(2^m)$, which can be considered a third encipherment of the private message M and is another vector of m binary digits. From equations (3), (5) and (6), it follows that $$Y_3 = M^{E_K(Q(2^m-1)+1)} = (M^{QE_K})^{2^m-1} M^{E_K} \quad (7)$$

But $M^{QE_K}$ is some non-zero element of $GF(2^m)$, and every non-zero element B of $GF(2^m)$ satisfies $$B^{2^m-1} \times 1 \quad (8)$$

as shown in "The Theory of Error Connecting Codes" by F. J. MacWilliams and N. J. A. Sloane, p. 96, North Holland Publishing Co., 1977.

From equations (7) and (8) it follows that $$Y_3 = M^{E_K} \quad (9)$$

User J now sends this third public message $Y_3$ to User K over the insecure transmission channels of the network as shown in FIG. 1. Upon receipt of $Y_3$, User K makes use of the second integer $D_K$ that he earlier obtained from his special random number generator in order to perform the exponentiation indicated by block 4 in FIG. 1, which yields the element $Y_3^{D_K}$ of $GF(2^m)$. The integer $D_K$ is that integer between 1 and $2^m-2$ inclusive with the property that $$E_K D_K = Q'(2^m - 1) + 1 \quad (10)$$

for some integer Q'. By virtue of equations (9) and (10), it follows that $$Y_3^{D_K} = M^{E_K D_K} = M^{Q'(2^m-1)+1} = (M^{Q'})^{2^m-1} M \quad (11)$$

But $M^{Q'}$ is a non-zero element of $GF(2^m)$ so that equation (8) can be invoked in equation (11) to give $$Y_3^{D_K} = M$$

Thus, as shown in FIG. 1, User K has now obtained the private message M that User J had intended to send him.

In order for the above-described exchange of public messages to constitute a secure cryptographic system, it must be virtually impossible for an illegitimate receiver of the public messages $Y_1$, $Y_2$ and $Y_3$ to determine the private message M which they encipher. If this illegitimate receiver were able to compute logarithms in the finite field $GF(2^m)$, then he could first obtain $E_K$ as $$E_K = \log_{Y_1}(Y_2) \quad (12)$$

as follows from equation (2). He could then relatively easily calculate $D_K$ by use of Euclid's greatest common divisor algorithm applied to the integers $2^m-1$ and $E_K$. He could then easily calculate $Y_3^{D_K} = M$ in the same manner as the legitimate receiver, User K. However, the taking of logarithms in $GF(2^m)$ in the light of present knowledge appears to be virtually impossible when m is large, e.g. $m \geq 100$, so the illegitimate receiver will not succeed with such an attack. There appears to be no way for the illegitimate receiver to obtain M from $Y_1$, $Y_2$ and $Y_3$ that is not computationally equivalent at some point to the calculation of a logarithm in $GF(2^m)$, although at present there is no way to give a mathematical proof of this equivalence. In fact, there has never been published a mathematical proof of the security of any cryptographic system that does not rely on the prior private exchange of as many bits of secret key as there are bits in all the messages that will be enciphered using that key. The cryptographic security of the system diagrammed in FIG. 1, while not mathematically provable, rests on as solid a foundation as that of any system known to the applicants that avoids the private exchange of secret keys.

Although in practical embodiments, the value of m used with the invention would be quite large, m=127 being a preferred number for reasons that will be explained later, the invention will be described in full detail for the small value m=7 for ease of understanding.

The finite field $GF(2^7)$ will be represented using a normal basis as explained in applicants' aforementioned European application Ser. No. 81110018.9. This representation begins by choosing $P(X)=X^7+X^6+1$ as a polynomial of degree m=7 that is irreducible in the binary number field GF(2) and that has linearly independent roots.

The next step is to define A to be the root of P(X), that is, to specify that $$A^7+A^6+1=0 \tag{12a}$$

The following assignment of unit vectors with binary components to the normal basis is now made:

$A=[0,0,0,0,0,0,1]$ $A^2=[0,0,0,0,0,1,0]$ $A^4=[0,0,0,0,1,0,0]$ $A^8=[0,0,0,1,0,0,0]$ $A^{16}=[0,0,1,0,0,0,0]$ $A^{32}=[0,1,0,0,0,0,0]$ $A^{64}=[1,0,0,0,0,0,0]$

Arbitrary elements B and C of $GF(2^7)$ are now represented by the vectors $B=[b_6,b_5,b_4,b_3,b_2,b_1,b_0]$ and $C=[c_6,c_5,c_4,c_3,c_2,c_1,c_0]$ with the meaning that $$B=b_6A^{64}+b_5A^{32}+b_4A^{16}+b_3A^8+b_2A^4+b_1A^2+b_0A \tag{12b}$$

and $$C=c_6A^{64}+c_5A^{32}+c_4A^{16}+c_3A^8+c_2A^4+c_1A^2+c_0A \tag{12c}$$

Upon squaring equation (12b) and making use of the facts that $b^2=b$ in GF(2), that squaring is a linear operation in $GF(2^7)$, and that $A^{128}=A$ in $GF(2^7)$, one obtains $B^2=b_5A^{64}+b_4A^{32}+b_3A^{16}+b_2A^8+b_1A^4+b_0A^2+b_6A$ or $B^2=[b_5,b_4,b_3,b_2,b_1,b_0,b_6]$ Thus, squaring in $GF(2^7)$ for this normal basis representation can be performed by simply shifting the high order binary digit to the low order position. A circulating shift register can be utilized to accomplish this objective.

Because $1^2=1$ and because squaring with a normal basis representation corresponds to a rotation of the vector representing an element of $GF(2^7)$, it follows that the element 1 of $GF(2^7)$ must always be represented by the all-ones vector, or equivalently, that $$1=A+A^2+A^4+A^8+A^{16}+A^{32}+A^{64} \tag{12d}$$

From equations (12a) and (12d), the binary vector representation can be found for all 128 elements of $GF(2^7)$. The product of equations (12b) and (12c) may then be carried out to obtain:

$D=BC=[d_6, d_5, d_4, d_3, d_2, d_1, d_0]$

The binary components $d_i$ of the product vector D, for i=0 to 6, can be shown to be determined by the equation:

$$\begin{aligned} d_i = &\ b_i(c_{i-1} + c_{i-3} + c_{i-6}) + c_i(b_{i-1} + b_{i-3} + b_{i-6}) + \\ &\ b_{i-3}(c_{i-1} + c_{i-2} + c_{i-4}) + c_{i-3}(b_{i-1} + b_{i-2} + b_{i-4}) + \\ &\ b_{i-4}(c_{i-2} + c_{i-5} + c_{i-6}) + c_{i-4}(b_{i-2} + b_{i-5} + b_{i-6}) + \\ &\ b_{i-1}c_{i-5} + b_{i-5}c_{i-1} + b_{i-1}c_{i-1} \end{aligned} \tag{13}$$

where any negative subscripts are understood to be taken modulo 7; that is, a subscript formally equal to $-1$ is understood to mean a 6, a subscript formally equal to $-2$ is understood to mean a 5, etc. For instance, taking i=3 in equation (13) gives $$\begin{aligned} d_3 = &\ b_3(c_2 + c_0 + c_4) + c_3(b_2 + b_0 + b_4) + \\ &\ b_0(c_2 + c_1 + c_6) + c_0(b_2 + b_1 + b_6) + b_6(c_1 + c_5 + c_4) + \\ &\ c_6(b_1 + b_5 + b_4) + b_2c_5 + b_5c_2 + b_2c_2. \end{aligned} \tag{14}$$

The operations in equations (13) and (14) are in GF(2), and are also called modulo-two arithmetic. Multiplication in GF(2) coincides with the AND operation of digital logic; addition in GF(2) coincides with the EXCLUSIVE OR operation of digital logic.

From equation (13), it is evident that the product D=BC has the property that each successive component $d_i$ can be formed by rotating the components $b_i$ and $c_i$ by one position. Thus, the same logic circuitry which when applied to the components of the vectors representing B and C produces $d_{m-1}$ for i=m−1, will sequentially produce the remaining components $d_{m-2}$, $d_{m-3}$, ... $d_2$, $d_1$, $d_0$, of the product when applied to the components of the successive rotations of the vectors representing B and C. This feature permits the use of one simple logic circuit (hereinafter denoted that O-M circuit) that sequentially calculates the m components of the product. Alternatively, this feature permits the use of m identical O-M circuits to calculate simultaneously all m components of the product.

FIG. 1a is the block-logic diagram for a multiplier for $GF(2^7)$ disclosed in applicant's aforementioned European application Ser. No. 81110018.9 that sequentially computes each binary component of the product. FIG. 1a utilizes an O-M circuit 200 consisting of seven modulo two adders, 201, 203, 205, 207, 209, 211 and 213 and nine AND gates, 215, 217, 219, 221, 223, 225, 227, 229, and 231, and two seven stage circulating shift registers 233 and 235. The m binary digits of the two elements to be multiplied are loaded into shift registers 233 and 235. Shift register 237, shown after 1 clock cycle, collects the components of the product. Recalling that modulo 2 multiplication coincides with the logical AND operation and modulo 2 addition coincides with the logical EXCLUSIVE OR operation, it follows that the output for the multiplier of FIG. 1a after one cycle of the clock will be $d_6$, as given by equation 13 for i=6. Shift registers 233 and 235 shift their contents one position leftward during the second clock cycle, so that the resulting output will be $d_5$ during this cycle. Similarly, it can be shown that after 7 clock cycles, all 7 components of the product D will have been determined and will be the contents of shift register 237.

Figure 1B:
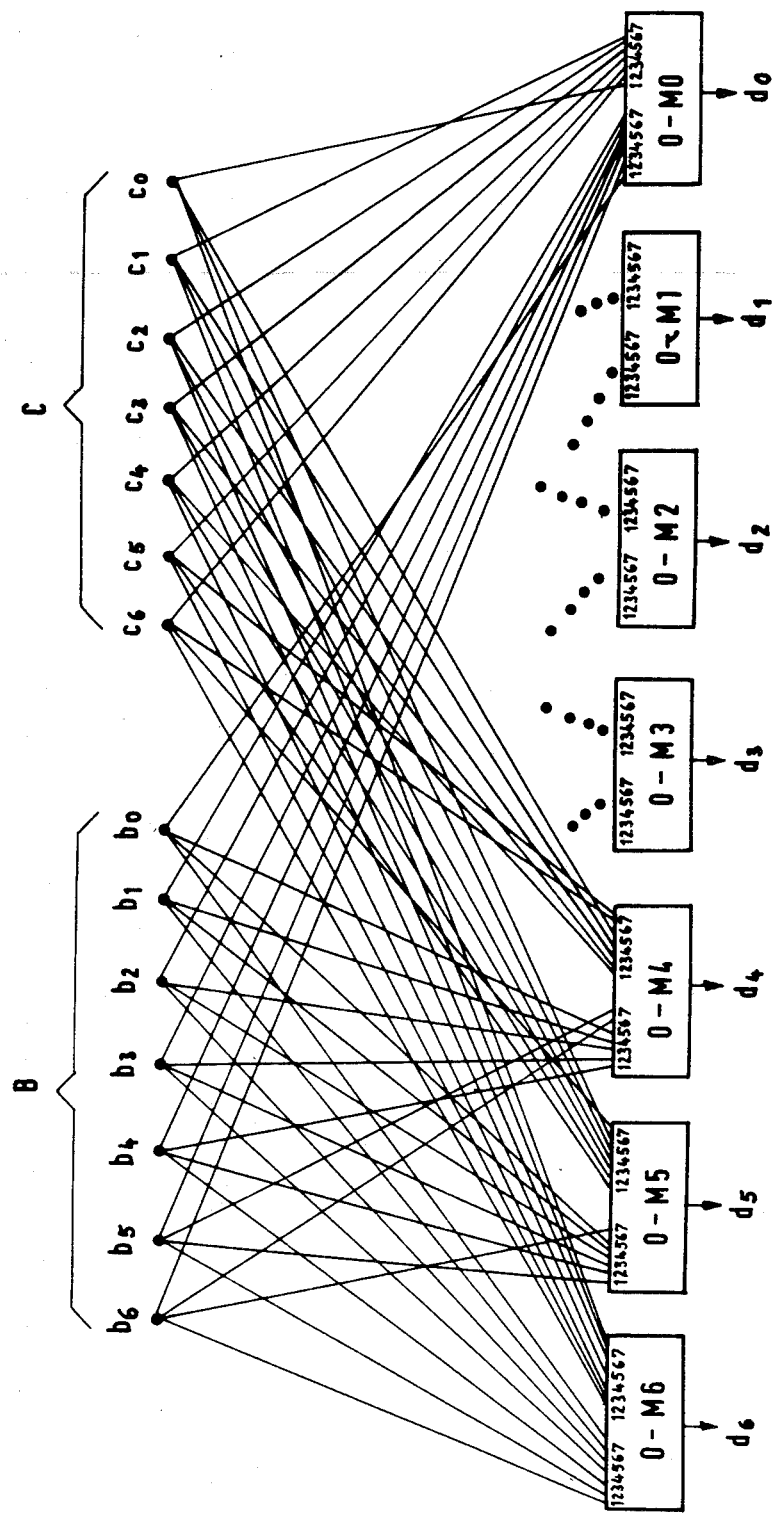
FIG. 1b is a block diagram of a multiplier for $GF(2^7)$ that simultaneously computes each binary component of the product.

FIG. 1b illustrates a multiplier which simultaneously computes all seven components of the product. It consists of seven identical O-M circuits with inputs to each successive O-M circuit rotated by one position. For sake of clarity, only the connections to the O-M circuits which calculate $d_6$, $d_5$, $d_4$ and $d_0$ are shown.

Figure 2:
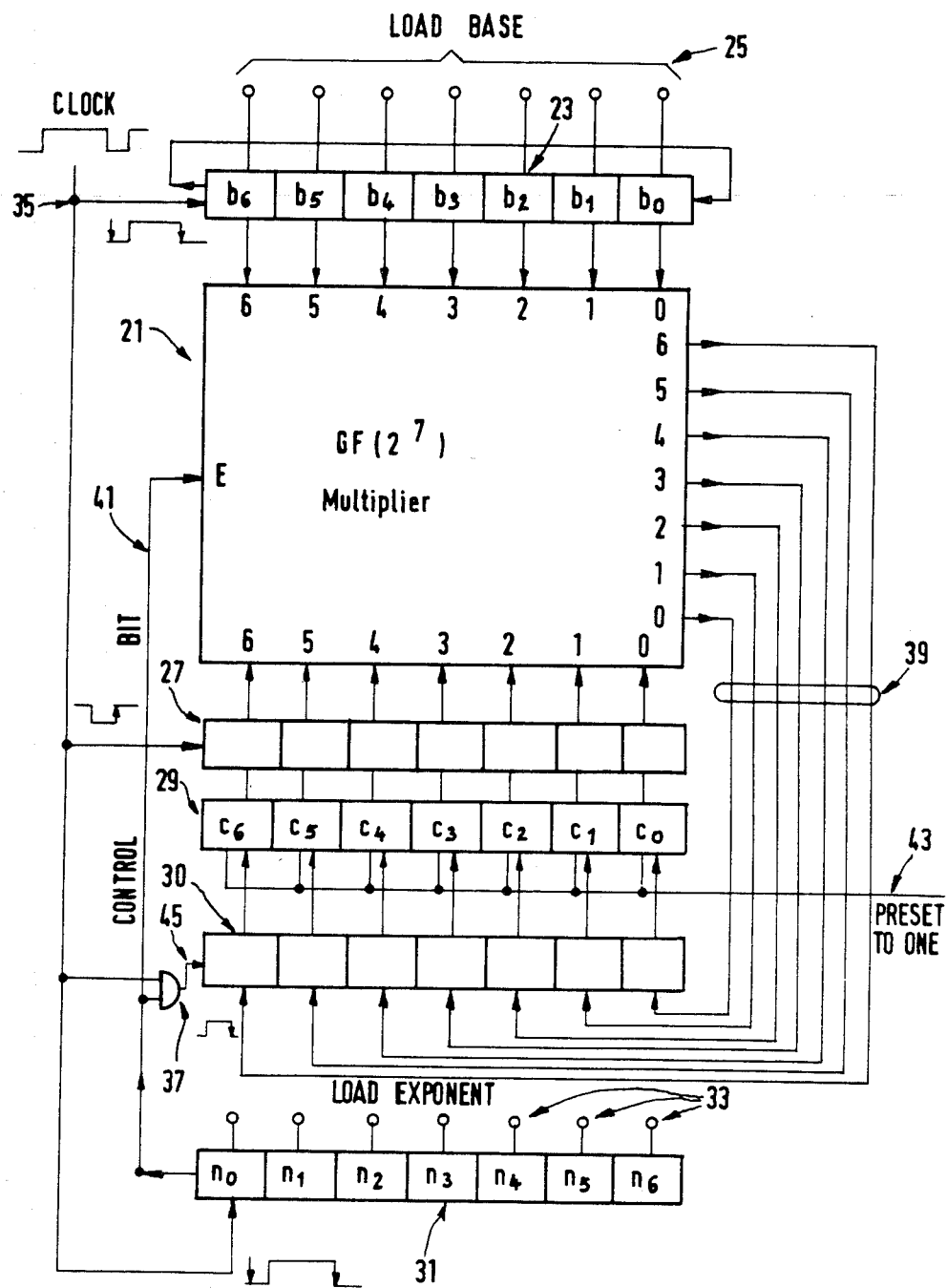
FIG. 2 is the block-logic diagram of a device for performing exponentiation in the finite field $GF(2^7)$.

FIG. 2 is the block-logic diagram of a device for performing exponentiation in the finite field $GF(2^7)$ wherein the $GF(2^7)$ multiplier 21 is a multiplier of the type shown in FIGS. 1a or 1b. If a multiplier of the type shown in FIG. 1a is utilized, a separate clock input to the multiplier operating at seven times the normal clock rate is required in order that the multiplier can sequentially produce all seven components of the product. At the end of seven of these clock cycles, the contents of register 237 in FIG. 1a would then be made available at the multiplier 21 output lines 39 in FIG. 2.

The device of FIG. 2 performs the computation of $B^N$ in the finite field $GF(2^7)$ by repeated squaring and multiplication. The device consists of multiplier 21 for the finite field $GF(2^7)$, as explained above, circulating shift register 23 with input lines 25, latch 27, accumulation register 29 with present inputs 43, shift register 31 with input lines 33, latch 30 clock line 35, AND gate 37, control line 41, and multiplier 21 output lines 39 which feed into latch 30. Registers 23 and 33 and latch 30 are trailing edge triggered. Latch 27 is triggered on the rising edge of the clock pulse. The binary components in normal basis representation of the element B of $GF(2^m)$ are loaded through lines 25 as the initial contents of the circulating shift-register 23 in FIG. 2. The accumulation register 29 is initially loaded through preset inputs 43 with $c_6=c_5=c_4=c_3=c_2=c_1=c_0=1$ which is the normal basis representation of the element C=1 of $GF(2^7)$. The shift-register 31 is initially loaded through lines 33 with the binary digits in the radix-two form of the integer N; that is, with the binary numbers $n_0, n_1, \ldots, n_6$ such that $$N = n_0 + 2^1 n_1 + 2^2 n_2 + 2^3 n_3 + \ldots 2^{m-1} n_{m-1} \text{ or,}$$

$$N = n_0 + 2n_1 + 4n_2 + 8n_3 + 16n_4 + 32n_5 + 64n_6 \quad (15)$$

where the additions on the right side of equation (15) are ordinary integer additions. Notice that N can be any integer between 0 and $1+2+4+8+16+32+64=127=2^7-1$ inclusive. From equation (15), $B^N$ may be written as $$B^N = B^{n_0 + 2n_1 + 4n_2 + 8n_3 + 16n_4 + 32n_5 + 64n_6} \quad (15a)$$

or, $$B^N = B^{n_0} B^{2n_1} B^{4n_2} B^{8n_3} B^{16n_4} B^{32n_5} B^{64n_6} \quad (15b)$$

Initially, $n_0$ is the control bit on line 41 in the device of FIG. 2. If $n_0=0$, then multiplier 21 is disabled and the clock input 45 to latch 30 will be 0 by virtue of AND gate 37, and thus no data may be transferred into accumulation register 29. The initial contents of register 29 therefore still remain. If $n_0=1$, however, multiplier 21 is enabled, and clock pulses on line 35 will be present on line 45, thus allowing data on the multiplier output lines 39 to be transferred into accumulation register 29 at the appropriate time. The latch 27 will transfer data from register 29 to the multiplier 21 when a rising edge of clock pulses on line 35 occurs. The inputs to multiplier 21 will therefore be the elements B and 1 of $GF(2^7)$, and the output will be the binary components of the representation of the element B·1=B of $GF(2^7)$ during the first clock cycle of the logic. These components then replace the original contents of register 29 when a trailing clock edge occurs on line 45. Thus, after one clock cycle of the logic, the contents of register 29 will be the representation of the element $B^{n_0}$ of $GF(2^7)$ for either value of the binary digit $n_0$.

At the same time that the product of multiplier 21 is transferred into register 29, the contents of the circulating shift-register 23 will be rotated leftward by one position. As explained above and in applicants' aforementioned European application Ser. No. 81110018.9, this causes register 23 to contain the normal basis representation of $B^2$, that is, $$B^2 = [b_5, b_4, b_3, b_2, b_1, b_0, b_6]$$

The contents of shift-register 31 are likewise shifted leftward by one position at the same time. Thus, after the first clock cycle, the control bit on line 41 changes to $n_1$. Recall that register 29 now contains the representation of $B^{n_0}$. Thus, if $n_1=0$, line 45 will be 0 during the second clock cycle of the logic so that register 29 will still contain the representation of the element $B^{n_0}$ of $GF(2^7)$ after this clock cycle. If $n_1=1$, however, latch 30 and multiplier 21 are enabled. On the rising clock edge, latch 27 will transfer the data in register 29 to the multiplier input. The output of the multiplier will be the binary components of the representation of the element $B^{n_0} \cdot B^2 = B^{n_0+2}$ of $GF(2^7)$ and these components that replace the prior contents of register 29 on the trailing clock edge. Thus, after two clock cycles of the logic, the contents of register 29 will be the representation of the element $B^{n_0+2n_1}$ for all four possible values of the two binary digits $n_0$ and $n_1$.

It should now be clear that, after m=7 clock cycles of the logic in FIG. 2, the contents of accumulation register 29 will be the representation of the element $$B^{n_0 + 2n_1 + 4n_2 + 8n_3 + 16n_4 + 32n_5 + 64n_6} = B^N \quad (16)$$

of $GF(2^7)$ as given by equation (15a). Thus, the device in FIG. 2 performs the desired expoentiation in $GF(2^7)$. Notice that at most m=7 multiplications in $GF(2^7)$ are performed in the process of calculating $B^N$.

The principle of calculation of $B^N$ exploited by the device of FIG. 2 is the technique for performing exponentiation called "repeated squaring and multiplication" that can be employed in any number system. A novel feature of this invention lies in the recognition that, because squaring in $GF(2^m)$ under a normal basis representation is performed by a simple rotation of the binary vector representing the element to be squared as explained above and in applicants' aforementioned European application Ser. No. 81110018.9, exponentiation can effectively be done using only at most m multiplications in $GF(2^m)$, rather than the at most 2 m multiplications that would be required if each squaring had to be performed as another multiplication as is the case when a conventional representation of $GF(2^m)$ is employed. Moreover, the normal basis representation also simplifies the multiplier itself for GF($2^m$) as is explained above and in said application.

Figure 2A:
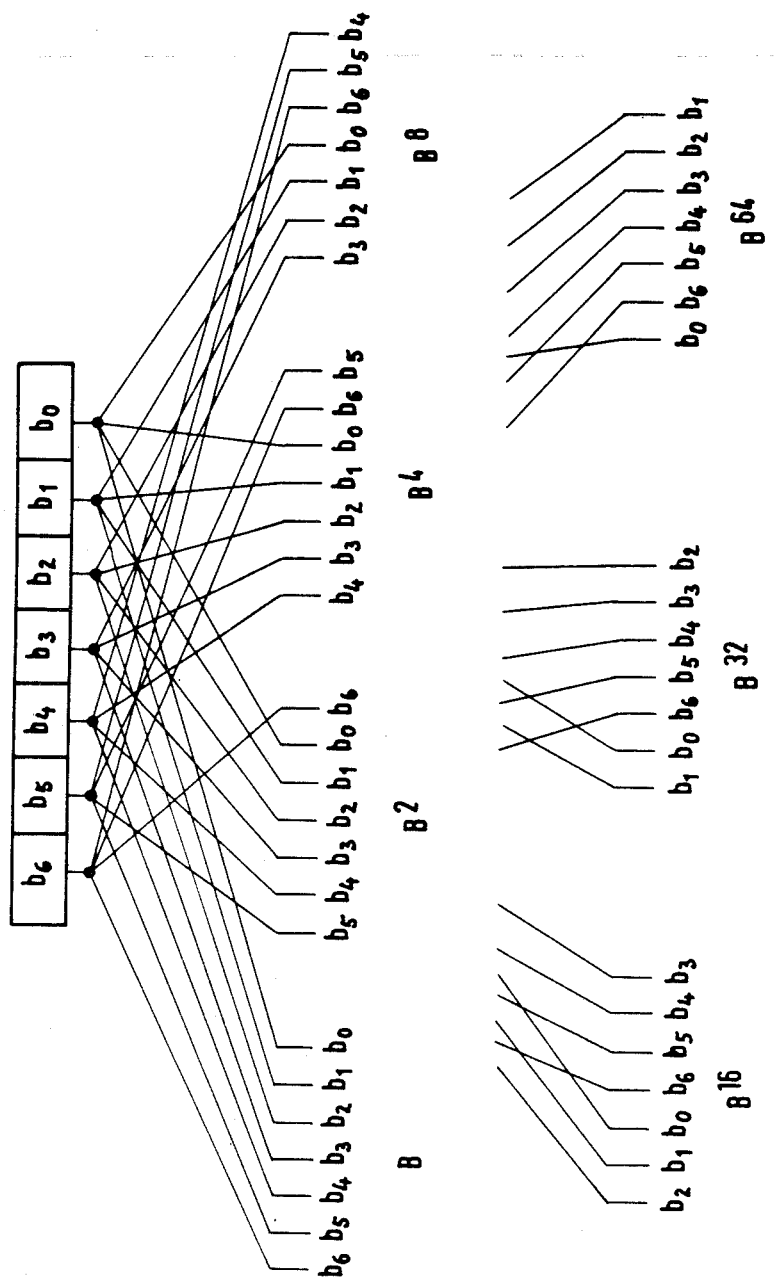
FIG. 2a illustrates how shifts of the binary sequence representing B provides $B^1, B^2, B^4, B^8, B^{16}, B^{32}$ and $B^{64}$.
Figure 2:
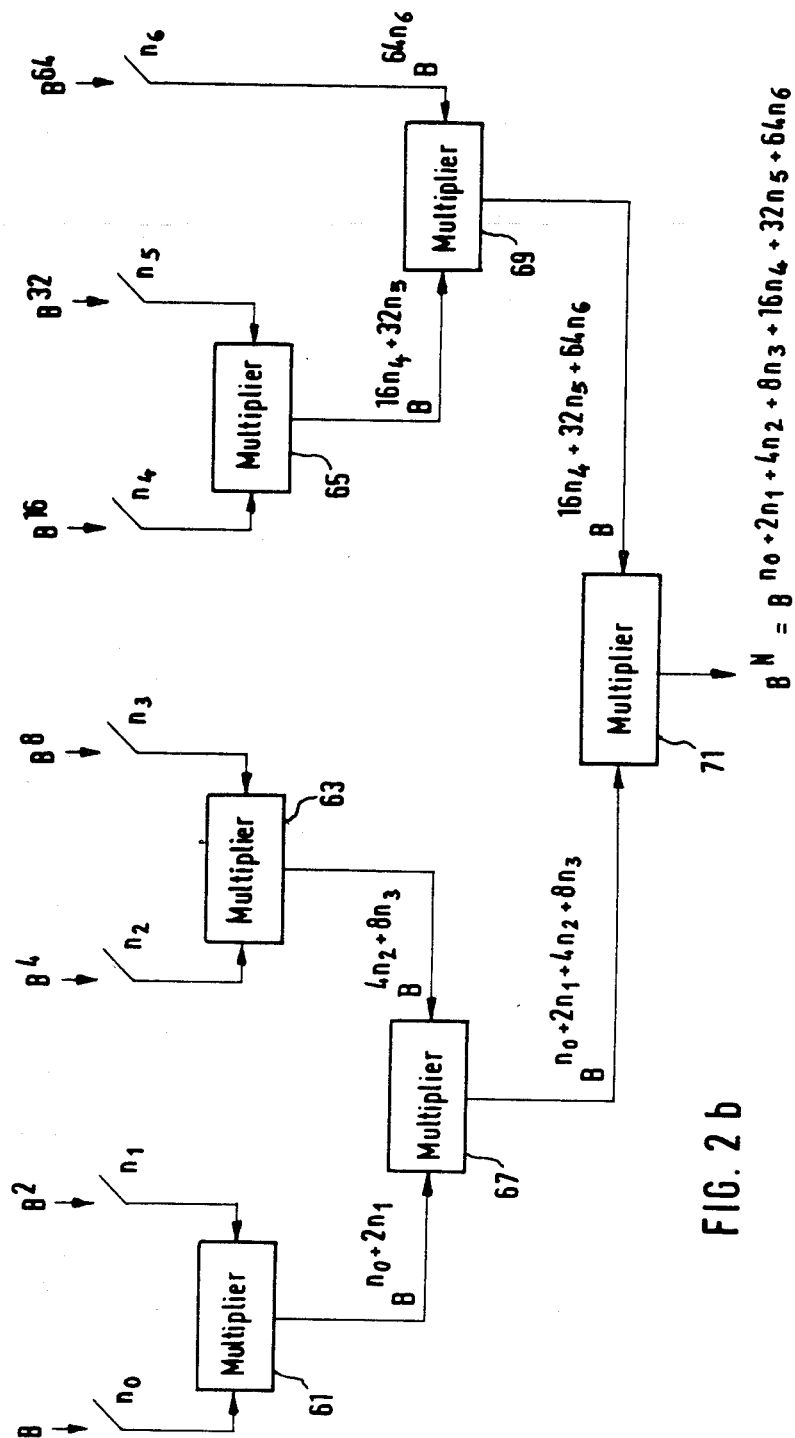

FIG. 2 illustrates the calculation of $B^N$ in serial form where a single GF($2^7$) multiplier is used 7 times. A parallel form of this same calculation is shown in FIGS. 2a and 2b. FIG. 2a illustrates that by simply shifting the binary sequence representing B the terms B, $B^2$, $B^4$, $B^8$, $B^{16}$, $B^{32}$, and $B^{64}$ are obtained in the normal basis representation. These terms can be used to obtain $B^N$ as shown in FIG. 2b. At the inputs to multiplier 61, if $n_o=1$, then B is entered as one term to be multiplied while $n_o=0$ results in 1 being entered in place of B. Similarly, if $n_1=1$ then $B^2$ is entered as a term to be multiplied by multiplier 61. Again if $n_1=0$ then 1 is entered in place of $B^2$. The resulting output of multiplier 61 is $B^{n_0+2n_1}$ for all four combinations of $n_o$ and $n_1$. Similar descriptions apply to multipliers 63 and 65 of FIG. 2b.

Note that multipliers 61, 63, and 65 can all be used simultaneously. The resulting outputs of multipliers 61 and 63 enter multiplier 67 while the output of multiplier 65 and $B^{64n_6}$ enter multiplier 69. Multipliers 67 and 69 can be used at the same time. Finally, the outputs of multipliers 67 and 69 are fed into multiplier 71 whose result is the desired exponentiation, $B^N$.

Note that in the parallel form of the calculation of $B^N$ shown in FIG. 2b, multipliers 61, 63, and 65 are used at the same time while in the next step multipliers 67 and 69 are used simulataneously. Multiplier 67 may in fact be a second use of multiplier 61 while multiplier 69 may be a second use of multiplier 63 or 65. Similarly multiplier 71 may be another use of multiplier 61, 63, or 65. In FIG. 2b there need be used at most 3 physically distinct multipliers where each one is used at most 3 times. In this parallel form the calculation of $B^N$ takes 3 multiplication time units while the serial form of FIG. 2 takes 7 multiplication time units, resulting in a 7/3 improvement in speed for the parallel form of FIG. 2b over the serial form of FIG. 2.

For GF($2^m$) the parallel calculation of $B^N$ requires at most m/2 multipliers each used at most ($\log_2 m$)+1 times. For GF($2^{127}$), where m=127, this parallel implementation requires 64 multipliers each used at most 7 times. This parallel form would operate approximately $127/7=18.14$ times faster than the serial form but would require 64 multipliers rather than one multiplier. Various combinations of parallel and serial hybrid forms can be implemented to compute $B^N$. The choice of any hybrid form depends on the tradeoff between the number of multipliers and the total time to compute $B^N$.

As will now be explained, the device of FIG. 3 produces the radix-two forms of a pair of integers E and D that each lie between 1 and $2^7-2=126$, inclusive, and that are related by $$DE=1 \pmod{127} \quad (17)$$

or, equivalently, satisfy $$DE=Q(127)+1 \quad (18)$$

for some integer Q. The value of E, which uniquely determines the value of D according to equation (17), is in turn determined by the initial contents of the circulating shift-register 31 in FIG. 3 in the fashion that the random selection of these initial contents will result in a corresponding random selection of E. The manner in which the initial contents of register 31' are randomly selected, in accordance with the invention, will be explained later.

Figure 3:
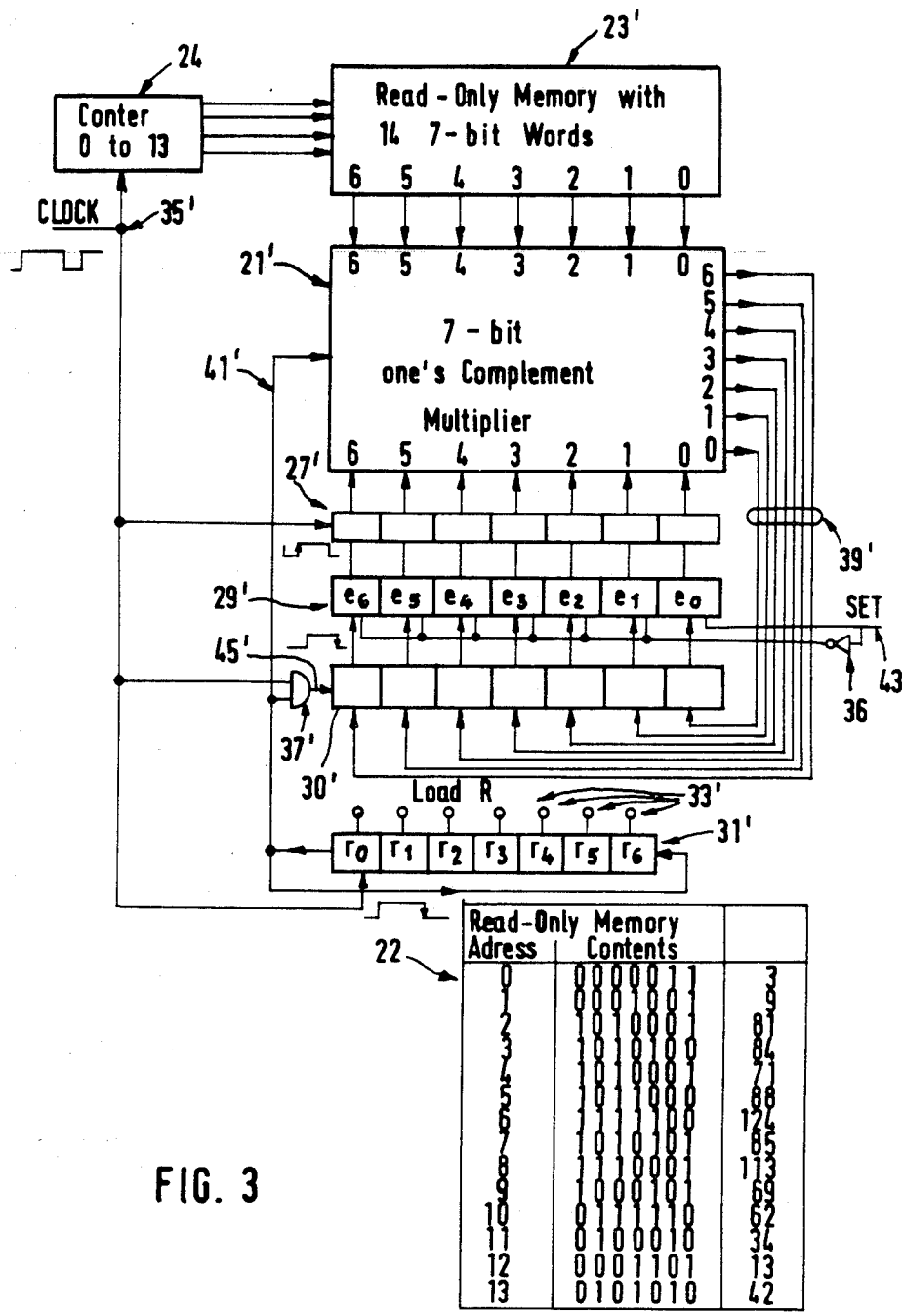
FIG. 3 is the block-logic diagram of a device for computing the integers $E=3^R$ and $D=3^{-R}$ modulo 127 where R is an integer between 1 and 127 inclusive.

The structure of the device in FIG. 3 is similar to that of the device in FIG. 2; the reference numbers in FIG. 2 have been assigned to emphasize this similarity. The device of FIG. 3 comprises a 7 bit one's complement multiplier 21', a read only memory 23' with 14 addresses, latches 27' and 30', accumulation register 29' with set inputs which allow loading of the initial contents $e_6=e_5=e_4=e_3=e_2=e_1=0$ and $e_0=1$ by virtue of line 43 and inverter 36, control line 41', circulating shift register 31', 14 state counter 24, clock line 35', and AND gate 37' which allows data to be transferred via latch 30' into register 29'. Table 22 illustrates the contents at the 14 addresses of the read only memory 23'.

In general, arithmetic modulo $2^m-1$ (that is, arithmetic for the set of integers between 0 and $2^m-2$ inclusive in which sums and products are assigned as their values the remainders when the values of the corresponding ordinary integer sums and products are divided by $2^m-1$) is called m-bit one's complement arithmetic. Such arithmetic is widely used in computing devices. In particular, the design of one's complement multipliers is a conventional task. See, e.g., "Digital Networks and Computer Systems," by T. L. Booth, p, 250, John Wiley and Sons, 1971. In the special case where $p=2^m-1$ is a prime p, one's complement arithmetic coincides with the arithmetic of the finite field GF(p). A prime of the form $p=2^m-1$ is called a Mersenne Prime; $p=2^7-1$ is a Mersenne prime as are also $p=2^{127}-1$ and $p=2^{521}-1$. Although the invention can be used with any choice of a large integer m, the preferred choice for m is such that $p=2^m-1$ is a Mersenne prime as this enhances the cryptographic security of the system for reasons that will be stated later.

The device of FIG. 3 incorporates a 7-bit one's complement multiplier 21' which, as has just been mentioned, is also a multiplier for the finite field GF(127) whose elements are the integers between 0 and 126 inclusive. As a GF(127) equation, equation (17) becomes simply $$DE=1 \quad (19)$$

The element 3 of GF(127) is a primitive element in the sense that $3^j$ takes on each non-zero field element as its value for $j=1, 2, \ldots, 126$. The multiplicative inverse of 3 in GF(127) is 85 as can be seen from the fact that the ordinary integer product 255 of 3 and 85 has a remainder 1 when divided by 127. One thus writes the GF(127) equations $$(3)(85)=1 \quad (20)$$

and $$(3)^{-1}=85 \quad (21)$$

Let R denote the integer whose radix-two form is the initial contents of register 31' in FIG. 3, that is, $$R=r_0+2r_1+4r_2+8r_3+16r_4+32r_5+64r_6 \quad (22)$$

It will now be shown that the device in FIG. 3 produces the elements E and D of GF(127) given by $$E=3^R \quad (23)$$

and $$D = 3^{-R} = (85)^R \tag{24}$$

from which it will then follow that equation (19) holds or, equivalently, that equations (17) and (18) hold.

The read-only memory 23' in FIG. 3 has the radix-two forms modulo 127 of the elements 3, $3^2=9$, $3^4=81$, $3^8=84$, $3^{16}=71$, $3^{32}=88$ and $3^{64}=124$ of GF(127) stored in memory locations 0,1,2,3,4,5 and 6, respectively, as indicated by table 22 in FIG. 3. Moreover, the initial content of the register 29' is the radix-two form of the element 1 of GF(127), namely $e_0=1$ and $e_1=e_2=e_3=e_4=e_5=e_6=0$. The counter 24 counts from 0 to 13 in 14 clock cycles and selects in each clock cycle that location in the read-only memory 23' whose contents then form one of the inputs to the multiplier 21'. By reasoning exactly analogous to that used to show that the device of FIG. 2 is seven clock cycles computed the element of $GF(2^7)$ given by equation (16), it follows that at the end of 7 clock cycles the device of FIG. 3 will have as the contents of register 29' the radix-two form of the element E of GF(127) given by $$E = 3^{r0 + 2r1 + 4r2 + 8r3 + 16r4 + 32r5 + 64r6} = 3^R \tag{25}$$

At this point, E is removed from register 29' for use elsewhere in the system. Register 29' is then again loaded with the radix-two form of the element 1 of GF(127). As indicated by table 22 in FIG. 3, the read-only memory 23' has the radix-two forms of the elements $3^{-1}=85$, $3^{-2}=113$, $3^{-4}=69$, $3^{-8}=62$, $3^{-16}=34$, $3^{-32}=13$, and $3^{-64}=42$ stored in memory locations 7,8,9,10,11,12 and 13, respectively. Moreover, the circulating shift-register 31' has now returned to its original contents. Thus, by the same reasoning as led to equation (25), it follows that at the completion of 14 clock cycles the device of FIG. 3 will have as the contents of register 29' the radix-two form of the element D of GF(127) given by $$D = 3^{-r0 - 2r1 - 4r2 - 8r3 - 16r4 - 32r5 - 64r6} = 3^{-R} \tag{26}$$

The use of the same logic to calculate both E and its modulo $2^m-1$ inverse D is a novel feature of the invention. The conventional approach to finding a pair of integers whose product is 1 modulo an integer n, as described for example in the paper "A Method for Obtaining Digital Signature and Public Key Cryptosystems," by R. L. Rivest, A. Shamir and L. Adleman, Comm. of A.C.M., Vol. 21, pp. 120-126, Feb. 1978, calls for a direct random selection of the first integer E. The resulting E is then tested using Euclid's greatest common divisor algorithm to ensure that E and n are relatively prime (which test, however, is unnecessary if n is a prime), as this relative primeness is the necessary and sufficient condition for D satisfying DE=1 (mod n) to exist. If E and n are not relatively prime, another random choice of E must be made, etc. When an E relatively prime to n has been selected and confirmed by Euclid's algorithm, that algorithm will as a by-product yield the integer D satisfying DE=1 (mod n). However, an implementation of Euclid's algorithm requires circuitry to perform integer division and to perform addition modulo n, as well as circuitry to perform multiplication modulo n. Only circuitry to perform multiplication modulo n is required in the device of FIG. 3 as it calculates both D and E after an initial random selection of the integer R.

When and only when m is such that $p=2^m-1$ is a prime will it be possible to find an integer H between 1 and $2^m-2$ inclusive such that $H^i$ takes on the values of each integer in this range for i=1, 2, ..., $2^m-2$. Recall that H=3 was such a value for m=7. The usefulness of such an H is that choosing the integer R equally likely in the range from 1 to $2^m-2$ then results in $E=H^R$ being equally likely also to take on any value in this same range, thus maximizing the difficulty to a cryptanalyst who must determine such exponents E in order to defeat the cryptographic security of the system of this invention. This is one reason for preferring a choice of m such that $p=2^m-1$ is a prime for use with the invention. A second reason is that, for such m, the calculation of logarithms in $GF(2^m)$ cannot be simplified by algorithms that circumvent the general difficulty of taking logarithms in the finite field GF(q) by making use of the factorization of q−1, as explained in the paper, "An Improved Algorithm for Computing Logarithms over GF(p) and its Cryptographic Significance," by S. Pohlig and M. Hellman, IEEE Trans. on Info. Th., Vol. IT-24, pp. 106-110, Jan. 1978.

There is a third and still more compelling reason for preferring a choice of m such that $p=2^m-1$ is a prime. When $p=2^m-1$ is a prime, then every element B of $GF(2^m)$, excepting 0 and 1, is a primitive element. This means that $B^i$ takes on the value of each of these $2^m-2$ elements for i=1, 2, ..., $2^m-2$. Thus, when and only when $p=2^m-1$ is a prime, will $Y_1=M^{EJ}$ take on different values for all $2^m-2$ possible values of $E_J$ no matter what choice is made of the message M (which, it will be recalled, can be any element of $GF(2^m)$ except 0 or 1). Similarly, when and only when $p=2^m-1$ is a prime, will $Y_2=Y_1^{EK}$ take on different values for all $2^m-2$ possible values of $E_K$, regardless of the value of $Y_1$, and will $Y_3=Y_2^{DJ}$ take on different values for all $2^m-2$ possible values of $D_J$ regardless of the value of $Y_2$. This maximization of the number of potential values of $Y_1$, $Y_2$ and $Y_3$ maximizes the difficulty to the cryptanalyst who attempts to determine the private message M from knowledge only of the public messages $Y_1$, $Y_2$ and $Y_3$.

It remains to show how the binary digits $r_6$, $r_5$, $r_4$, $r_3$, $r_2$, $r_1$, $r_0$ in the radix-two form of the integer R are selected for insertion as the initial contents of the register 31' in FIG. 3. According to the invention, a new "random choice" of these binary digits would be made each time a User is called upon to generate a pair E, D of random integers; that is, each time he originates a secret message and each time he first receives a secret message, in accordance with the functional flow diagram of FIG. 1. For the purpose of this "random choice," various conventional methods of random number generation could be employed. However, the preferred method is to generate these random binary digits by the use of an m-stage maximal-length linear feedback shift-register. Such a shift-register is shown in FIG. 4 for the case m=7.

Figure 4:
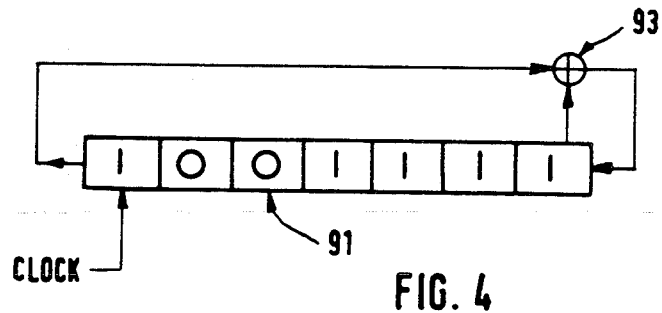
FIG. 4 is a block-logic diagram of a seven-stage maximal length linear feedback shift-register used to generate random numbers.

The 7-stage maximal-length shift-register of FIG. 4 consists of a 7-stage register 91, whose contents shift leftward one position each clock cycle, together with a modulo-two adder 93 adapted so as to form the modulo-two sum of the binary digits in the leftmost and rightmost stages of the register 91; this summed binary digit is then fed in to form the new binary digit in the rightmost stage when the contents of the register 91 is shifted. The "state" of the register 91 is the m-place binary vector whose components form the contents of the register 91 when read from left to right. In FIG. 4, the register is shown in the state [1,0,0,1,1,1,1]. The description "maximal length" for the linear feedback shift-register of FIG. 4 derives from the fact that, as the register is clocked, the state takes on in succession all $2^7-1=127$ possible values, excluding the all-zero value, and then continues to repeat this same succession of values.

According to the invention, the maximal-length shift-register of FIG. 4 is started in an arbitary non-zero state, then clocked continuously at a much higher rate than the clock rate used for the devices of FIGS. 2 and 3. Whenever a new "random choice" is needed for the state $[r_0,r_1,r_2,r_3,r_4,r_5,r_6]$ of the register 31' in FIG. 3, the clocking of the shift-register of FIG. 4 is temporarily interrupted long enough to transfer the current state of the register 91 into the register 31' of FIG. 3.

Figure 4A:
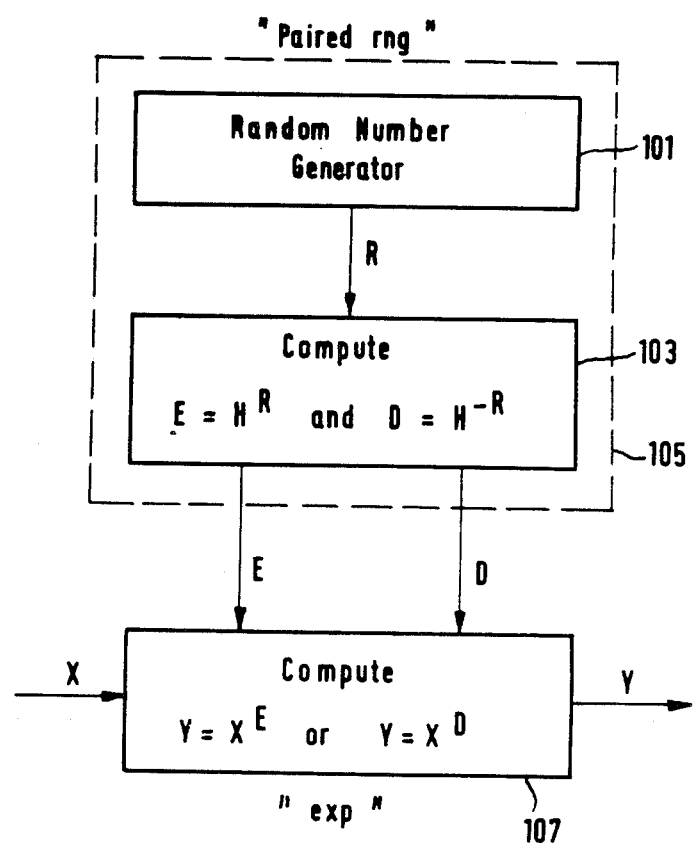
FIG 4a illustrates the system possessed by each user when the devices of FIGS. 2, 3, and 4 are used.

An example will now be given to show how the devices of FIGS. 2, 3 and 4 suffice to carry out the transmission of a private message from User J to User K in accordance with the functional flow diagram of FIG. 1. Each of these users is assumed to possess one each of the devices of FIGS. 2, 3 and 4 as illustrated in FIG. 4a. Block 101 is a random number generator of the type shown in FIG. 4. Block 103 is a device of the type in FIG. 3 and computes the two numbers E and D whose product is 1 modulo (127). Blocks 101 and 103 combined form the "Paired rng" 105 whose operation is shown in FIG. 1 as block 5 or 6. Block 107 is a normal basis exponentiator of the type shown in FIGS, 2, 2a or 2b, and whose operation is shown in FIG. 1 as blocks 1,2,3, or 4. The initial states of the maximal-length shift-registers in the random number generators 101 of User J and User K, are, however, independently selected and, preferably in accordance with the invention, these registers are being clocked at slightly different rates.

The signalling procedure begins when User J obtains the message
$M=[0,1,1,0,1,0,1]$
that is to be sent secretly to User K. User J first calls upon has maximal-length shift-register of the type in FIG. 4 which, it is assumed, is at that moment in the state [1,0,0,1,1,1,1]. User J then loads this state as the initial contents of register 31' in his device of the type in FIG. 3, so that these contents are now
$[r_6,r_5,r_4,r_3,r_2,r_1,r_0]=[1,1,1,1,0,0,1]$
which is the radix-two form of the integer R=121. As has been explained above in connection with equations (23) and (24), this device then proceeds to calculate the pair of integers $E_J$ and $D_J$ given by the modulo-127 equations
$E_J=3^{121}=23$
$D_J=3^{-121}=116$
The output from the device of FIG. 3 will be these two integers in radix-two form, namely
$E_J=[0,0,1,0,1,1,1]$
$D_J=[1,1,1,0,1,0,0]$
(In actual practice, User J might save time by forming $E_J$ and $D_J$ in advance of his receipt of the private message M to be transferred.) User J now loads this binary vector for $E_J$ into register 31 of his device of the type in FIG. 2, and loads the message binary vector M into register 23. The contents of these two registers are now
$E_J=[n_6,n_5,n_4,n_3,n_2,n_1,n_0]=[0,0,1,0,1,1,1]$
and
$M=[b_6,b_5,b_4,b_3,b_2,b_1,b_0]=[0,1,1,0,1,0,1]$
Register 29 of FIG. 2 is given the initial contents
$C=[c_6,c_5,c_4,c_3,c_2,c_1 c_0]=[1,1,1,1,1,1,1]$ This device then proceeds to calculate $Y_1=M^{E_J}$ as explained above in connection with equation (16). The answer resides in register 29 after the seven clock cycles are completed and will be found to be
$Y_1=[0,1,0,1,1,1,0]$
as may be verified by using equation (13) to calculate the output of the multiplier 21 each time it is required to multiply two elements of $GF(2^7)$. This $Y_1$ is the seven-bit message that User J now sends to User K over the available insecure transmission channels.

Upon receipt of the public message $Y_1$ from User J, User K calls upon his maximal-length shift-register of the type in FIG. 4 which, it is assumed, is at that moment in the state [1,0,0,1,1,0,1]. User K then loads this state as the initial contents of register 31' in his device of the type in FIG. 3 so that these contents are now
$[r_6,r_5,r_4,r_3,r_2,r_1,r_0]=[1,0,1,1,0,0,1]$
which is the radix-two form of the integer R=89. This device then proceeds to calculate $E_K$ and $D_K$ as given by the modulo-127 equations
$E_K=3^{89}=45$
$D_K=3^{-89}=48$
The output from the device of FIG. 3 will be these two integers in their radix-two forms, namely
$E_K=[0,1,0,1,1,0,1]$
and
$D_K=[0,1,1,0,0,0,0]$
(In actual practice, User K might save time by forming $E_K$ and $D_K$ in advance of his reception of the public message $Y_1$ from User J.) User K now loads this binary vector for $E_K$ into register 31 of his device of the type in FIG. 2, and loads the binary vector $Y_1$ into register 23 of FIG. 2. The contents of these two registers are now
$E_K=[n_6,n_5,n_4,n_3,n_2,n_1,n_0]=[0,1,0,1,1,0,1]$
and
$Y_1=[b_6,b_5,b_4,b_3,b_2,b_1,b_0]=[0,1,0,1,1,1,0]$
Register 29 is given the initial contents
$C=[c_6,c_5,c_4,c_3,c_2,c_1,c_0]=[1,1,1,1,1,1,1]$
This device then proceeds to calculate $Y_2=Y_1^{E_K}$, the result being
$Y_2=[0,0,0,1,1,1,0]$
this is the seven-bit public message that User K now sends back to User J over the available insecure transmission channels.

Upon receipt of $Y_2$, User J loads the binary vector $Y_2$ into register 23 of his device of the type in FIG. 2, and loads the radix-two form of $D_J$ (which he calculated earlier and has retained) into register 31; register 29 is given the initial contents [1,1,1,1,1,1,1]. This device then proceeds to calculate $Y_3=Y_2^{D_J}$, the result being
$Y_3=[0,1,0,1,1,1,1]$
This is the seven-bit public message that User J sends to User K over the available insecure transmission channels.

Upon receipt of $Y_3$, User K loads the binary vector $Y_3$ into register 23 of his device of the type in FIG. 2, and loads the radix-two form of $D_K$ (which he calculated earlier and has retained) into register 31; register 29 is given the initial contents [1,1,1,1,1,1,1]. This device then proceeds to calculate $Y_3^{D_K}$, the result being
$Y_3^{D_K}=[0,1,1,0,1,0,1]=M$
which can be seen to coincide with the original private message M. User K has now received this private seven-bit message from User J via the exchange of three public seven-bit messages.

According to the invention, it has been recognized that, in certain circumstances as will later be specified, the generation of pairs of integers E and D between 1 and $2^m-2$ such that $DE=1 \pmod{2^m-1}$ can advantageously be performed in a manner alternative to that described above in connection with the explanation of the function of the device in FIG. 3.

Figure 5:
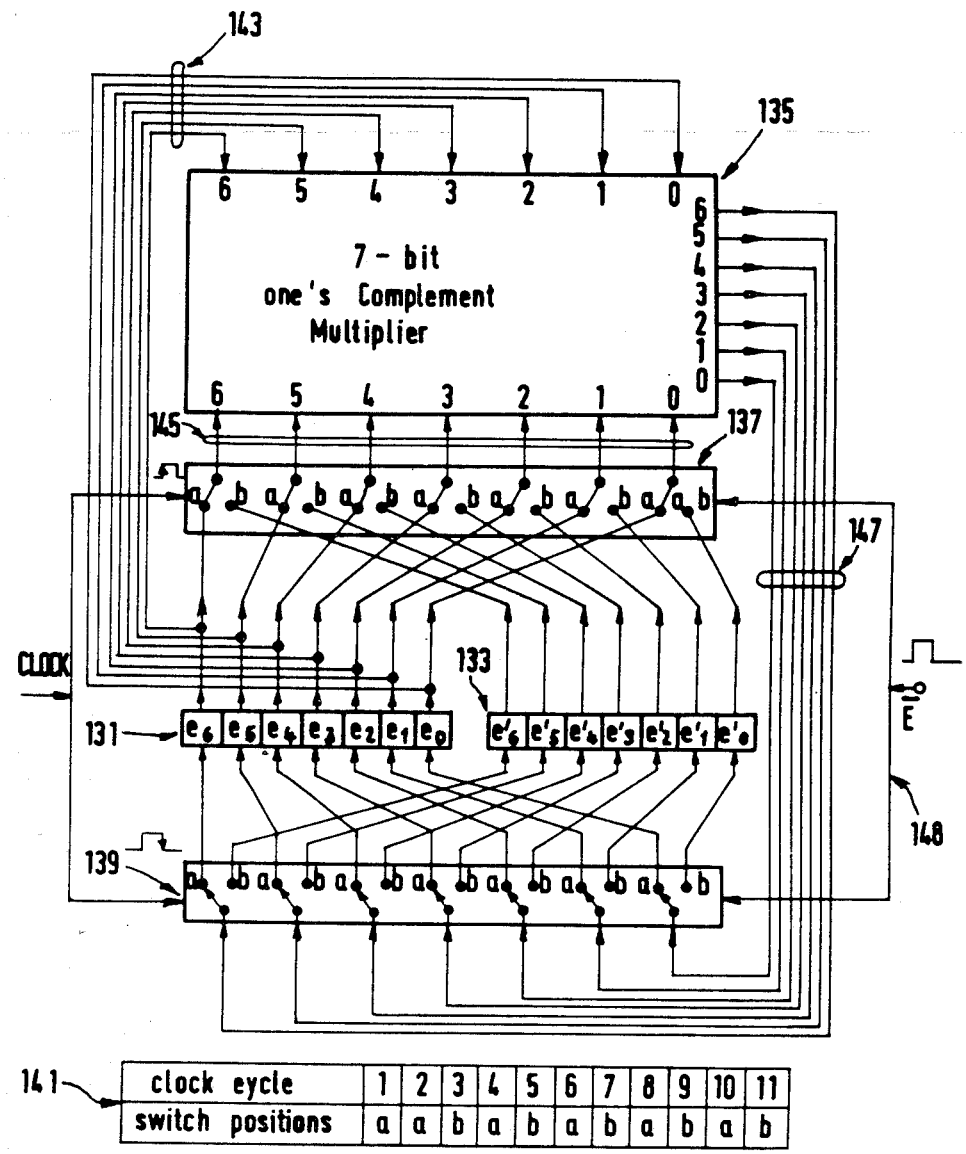
FIG. 5 is a block-logic diagram of a device for computing the integer $D=E^{125}$ modulo 127 where E is an integer between 1 and 126 inclusive.

As will now be explained for the case $m=7$, the device of FIG. 5, when presented with an integer E between 1 and $2^m-2=126$ inclusive, calculates the integer D between 1 and $2^m-2=126$ inclusive such that $DE=1 \pmod{127}$. The device consists of accumulation registers 131 and 133, 7-bit one's complement multiplier 135, and dual position switches 137 and 139. Switches 137 make in either position on a rising clock edge. At all other times, the switches remain open. In FIG. 5, switches 137 are shown during a rising edge clock transition. Switches 139 make in either position only on a falling edge and remain open at other times. In FIG. 5, switches 139 are shown during a falling clock edge transition. The positions of switches 137 and 139 at their respective clock cycle transitions are specified by table 141. A disable line, 148, to switches 137 and 139 prevents the switches from alternating between the first two clock cycles, but allows such alteration once the disable signal is removed after the second clock cycle. Such a disable signal can be obtained by applying a single pulse to switches 137 and 139 during the first two clock cycles.

The accumulation registers 131 and 133 in FIG. 5 are both initially loaded with the binary digits in the radix-two form of E. That is, $$E = e_0 + 2e_1 + 4e_2 + 8e_3 + 16e_4 + 32e_5 + 64e_6 \tag{27}$$

and $e'_i = e_i$ for $i=0,1,2,3,4,5$ and 6. One input to the multiplier 135 is permanently connected to accumulation register 131 via lines 143; the other input to multiplier 135 is connected to either accumulation register 131 or to accumulation register 133 according to whether switches 137 are in position a or position b, respectively, via lines 145. The output of multiplier 135 is stored via lines 147 into either accumulation register 131 or accumulation register 133 according to whether switches 139 are in position a or position b, respectively. Thus, whenever switches 137 and 139 are in position a, both inputs to the multiplier 135 are connected to register 131 so that the multiplier forms the square (modulo 127) of the integer stored in register 131, and this square is then stored as the new contents of register 131. But when switches 137 and 139 are in position b, the multiplier 135 forms the product (modulo 127) of the integers stored in registers 131 and 133, and this product is then stored as the new contents of register 133.

It must be noted that switches 137 and 139 are only utilized conceptually here. In practice, the switches 137 might be a pair of latches with common outputs and individual inputs. Similarly, switches 139 might be a pair of latches with common inputs and individual outputs.

When the first rising edge clock transition occurs, switches 137 make in position a as specified by table 141 in FIG. 5. Thus, the multiplier 135 forms the square modulo 127 of the integer E that was loaded initially into register 131, and this resulting integer $E^2 \pmod{127}$ is then stored as the new contents of register 131 via switches 139 on the falling clock edge. Thus, after one clock cycle, E still resides in register 133 while $E^2 \pmod{127}$ now resides in register 131. When the second rising edge clock transition occurs, switches 137 again make in position a as specified by table 141. The multiplier 135 now forms the square modulo 127 of the integer $E^2$ (mod 127) currently residing in register 131, and this resulting integer $E^4 \pmod{127}$ is then stored as the new contents of register 131 on the falling edge via switches 139. Thus, after two clock cycles, E still resides in register 133 while $E^4 \pmod{127}$ now resides in register 131. When the third rising edge clock transition occurs, switches 137 make in position b as specified by table 141. The multiplier 135 now forms the product of the integers $E^4 \pmod{127}$ and E currently residing in registers 131 and 133, respectively, and this resulting integer $E^5 \pmod{127}$ is then stored as the new contents of register 133 via switches 139 on the falling clock edge. Thus, after three clock cycles, $E^4 \pmod{127}$ resides in register 131 while $E^5 \pmod{127}$ resides in register 133. Continuing this reasoning, one finds the contents of registers 131 and 133 at the end of clock cycles 4,5,6,7,8,9,10 and 11 to be as given in the following table:

| clock cycle | register 131 | register 133 |
| --- | --- | --- |
| 4 | $E^8 \pmod{127}$ | $E^5 \pmod{127}$ |
| 5 | $E^8 \pmod{127}$ | $E^{13} \pmod{127}$ |
| 6 | $E^{16} \pmod{127}$ | $E^{13} \pmod{127}$ |
| 7 | $E^{16} \pmod{127}$ | $E^{29} \pmod{127}$ |
| 8 | $E^{32} \pmod{127}$ | $E^{29} \pmod{127}$ |
| 9 | $E^{32} \pmod{127}$ | $E^{61} \pmod{127}$ |
| 10 | $E^{64} \pmod{127}$ | $E^{61} \pmod{127}$ |
| 11 | $E^{64} \pmod{127}$ | $E^{125} \pmod{127}$ |

Thus, at the end of $2m-3=11$ clock cycles, the radix-two form of the integer $$D = E^{125} \pmod{127}$$

will reside in accumulation register 133 of the device in FIG. 5. But this integer D can now be seen to be the desired multiplicative inverse of E modulo (127) because $$DE = E^{126} \pmod{127}$$
$$= 1 \pmod{127}$$

where the second equality follows from the facts that modulo 127 arithmetic coincides with the arithmetic of the finite field GF(p) with $p=127$ and that every non-zero element of GF(p) satisfies $$E^{p-1} = 1 \pmod{p} \tag{28}$$ Ps The left side of equation (28) can be factored to give $$E^{p-2}E = 1 \pmod{p} \tag{29}$$

Thus, $$D = E^{p-2} \pmod{p} \tag{30}$$

is the integer between 1 and $p-1$ inclusive such that $$DE = 1 \pmod{p} \tag{31}$$

According to the invention, it has been realized that when the integer m is such that $p=2^m-1$ is a prime, then, when given an arbitrary integer E between 1 and $2^m-2$ inclusive, the integer D such that $$DE = 1 \pmod{2^m-1} \tag{32}$$

can advantageously be calculated by the exponentiation $$D = E^{p-2} = E^{2^m-3} \pmod{2^m-1} \tag{33}$$

Because $2^m - 3 = (2^{m-1} 2^{m-2} + \ldots + 2^3 + 2^2 + 2^1 + 2^0 + 1) - 2^1 - 2^0$, or, $2^m - 3 = 2^{m-1} + 2^{m-2} + \ldots + 2^3 + 2^2 + 2^0$, the right side of equation 33 is equal to the product modulo $2^m - 1$ of the m integers E, $E^2(\text{mod } 2^m - 1)$, $E^4(\text{mod } 2^m - 1)$, $E^8(\text{mod } 2^m - 1)$, ..., $E^{2^{m-1}}(\text{mod } 2^m - 1)$, excluding $E^2(\text{mod } 2^m - 1)$. Thus D, as given by equation (33), can be calculated from E by forming the m−1 squares $E^2(\text{mod } 2^m - 1)$, $E^4(\text{mod } 2^m - 1)$, ..., $E^{2^{m-1}}(\text{mod } 2^m - 1)$, and then after forming each of these squares, multiplying that square, except the first, into an accumulated product that initially was equal to E alone. The squarings require m−1 multiplications modulo $2^m - 1$, while forming the successive accumulated products requires m−2 further multiplications modulo $2^m - 1$, so that a total of exactly 2 m−3 multiplications modulo $2^m - 1$ are required to calculate the integer D satisfying equation (32). The device of FIG. 5 obtains D in this manner for the case m=7.

It should be noted for comparison that the method used by the device of FIG. 3 requires at most 2 m multiplications modulo $2^m - 1$ for the calculation of both E and D satisfying equation (32) and, on the average when E is randomly chosen between 1 and $2^m - 2$ inclusive, requires only m multiplications modulo $2^m - 1$. Thus, the alternative method used by the device of FIG. 5 to calculate the integer D satisfying equation (32) will generally be slower than the method used by the device of FIG. 3. Nonetheless, it has been recognized that, in certain modifications of the invention to be described later, the method of the device of FIG. 5 would be preferred when $p = 2^m - 1$ is a prime.

Figure 5A:
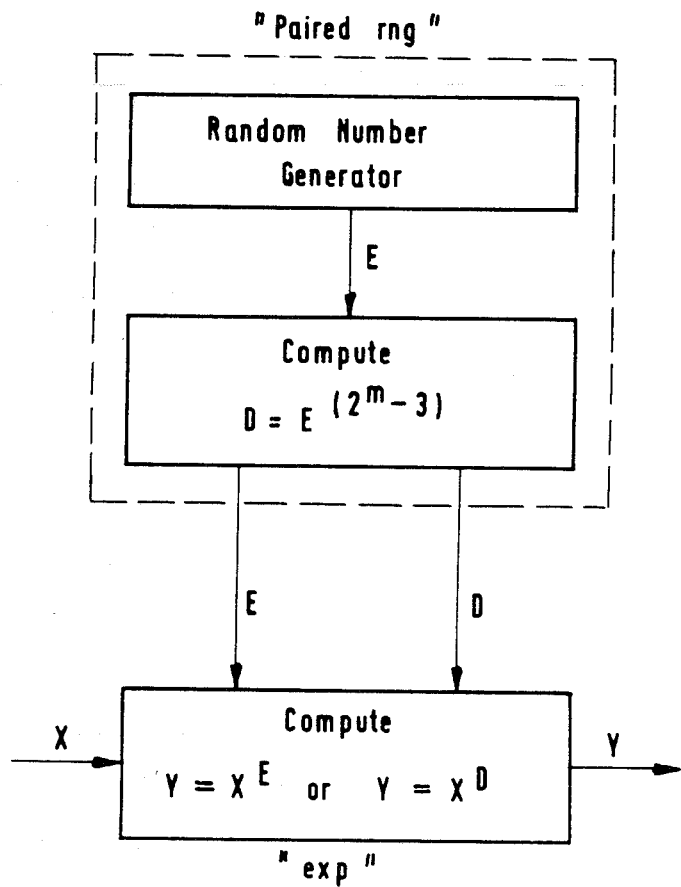
FIG. 5a illustrates the system possessed by each user when the devices of FIGS. 2, 4, and 5 are used.

When $p = 2^m - 1$ is a prime, the paired random number generation required according to the invention and previously discussed in connection with blocks 5 and 6 of FIG. 1 can be implemented as follows. A random number E between 1 and $2^m - 2$ inclusive is first generated, then the corresponding integer D between 1 and $2^m - 2$ inclusive satisfying equation (32) is calculated by the method used by the device of FIG. 5. For the generation of E, various conventional methods of random number generation could be employed. However, the preferred method is to generate E by the use of an m-stage maximal-length linear feedback shift-register such as that shown in FIG. 4 for the case m=7. According to the invention, this shift-register is started in an arbitrary non-zero state and is clocked continuously at a much higher rate than the clock rate used in the device of FIG. 5. Whenever a new random choice of E is needed, the clocking of the shift-register 91 of FIG. 4 is interrupted long enouguh to transfer the current state of the register 91 into the accumulation registers 131 and 133 of the device of FIG. 5. It is noted that this current state of register 91 can possibly be the all-one state corresponding to $E = 2^m - 1$, which is an invalid choice as E must lie between 1 and $2^m - 2$ inclusive. Additional logic could be employed to cause the maximal-length shift-register to be clocked one more cycle in this exceptional case. However, for the large values of m that would be used in practice with the invention, the probability of this invalid E is so small that it can preferably be ignored. For instance, with m=127, this probability is approximately $2^{-127}$ so that the device would malfunction only once every 400,000,000 years if no provision were made to exclude the invalid choice $E = 2^m - 1$ and the maximal-length shift register was required to produce a new choice of E every millisecond. FIG. 5a illustrates the system possessed by each user when the device of FIG. 5 is used to develop D from a random E.

In its basic form as previously described, the invention transfers an m-bit private message from one User to another User by an exchange of three m-bit public messages. When a private message much longer than m bits must be transferred or when several private messages must be transferred, the invention can usefully be modified in two ways that will now be explained so that, after an initial exchange of 3 public messages, private messages can be transferred using only one m-bit public message for each m-bit private message.

In the first such modification of the invention, the first User, say User J, would use his devices of the type in FIGS. 3 and 4 to produce the paired random numbers D and E that are integers between 1 and $2^m - 2$ inclusive which satisfy $DE \equiv 1 \pmod{2^m - 1}$. [When $p = 2^m - 1$ is a prime, User J could alternatively produce D and E by use of his devices of the type in FIGS. 4 and 5.] User J would then treat the m-bit radix-two form of D as the private message to be transferred to the other User, say User K, by the exchange of three public messages in the manner diagrammed in FIG. 1. After these three public messages are exchanged, User K also possesses the secret number D. Thereafter, whenever User J wishes to send an m-bit private message M to User K, User J uses his exponentiator of the type in FIG. 2 to form the element $$Y = M^E$$

of $GF(2^m)$ that he then transmits as an m-bit public message to User K. Upon receipt of Y, User K uses his exponentiator of the type in FIG. 2 to form $$Y^D = M^{DE} = M$$

and hence to obtain the private message M. Conversely, whenever User K wishes to send an m-bit private message M to User J, User K uses his exponentiator of the type in FIG. 2 to form $$Y = M^D$$

that he then transmits as an m-bit public message to User K. Upon receipt of Y, User J uses his exponentiator of the type in FIG. 2 to form $$Y^E = M^{DE} = M$$

and hence to obtain the private message M. Users J and K continue to use the same secret numbers D and E to exchange as many different private messages as they desire using only one m-bit public message to transfer each private message.

Recall that in the devices of FIGS. 3 and 4 the paired random numbers D and E are of the form $$E = H^R$$

and $$D = H^{-R}$$

for some known element H in $GF(2^m)$ and a number R that is randomly generated. A variation of the first modification discussed above may be made by having the first user, User J, treat the m-bit radix-two form of R as the private message to be transferred to the other user, User K, by the exchange of three public messages in the manner diagrammed in FIG. 1. Thus, R is the private message rather than D as discussed above. The number R may then be utilized by User K to determine both E and D by the use of the device in FIG. 3. User J also uses R to determine both E and D by use of the device in FIG. 3. Thereafter, when either User wishes to send a private message M to the other, he transmits the public message $Y=M^E$ from which the other obtains M in the manner $M=Y^D$. Users J and K continue to use the same secret numbers D and E to exchange as many different private messages as they desire using only one m-bit public message to transfer each private message.

In a second such modification of the invention that is applicable when $p=2^m-1$ is a prime and each user possesses a device of the type in FIG. 5 for the calculation of multiplicative inverses modulo $2^m-1$, the first User, say User J, would secretly choose an integer E between 1 and $2^m-2$ inclusive. User J would then treat the m-bit radix-two form of E as the private message to be transferred to the other User, say User K, by the exchange of three public messages in the manner diagrammed in FIG. 1. After these three public messages are exchanged, both User J and User K possess the secret number E. Both of these Users now use their devices of the type in FIG. 5 to calculate the integer D between 1 and $2^m-2$ inclusive such that $DE=1$ (mod $2^m-1$). Thereafter, when either of these two Users wishes to send an m-bit private message M to the other, he uses his exponentiator of the type in FIG. 2 to form $$Y=M^E$$

which he transmits as an m-bit public message to the other. Upon receipt of Y, the other User then uses his exponentiator of the type in FIG. 2 to form $$Y^D=M^{DE}=M$$

and hence to obtain the private message M. Users J and K continue to use the same secret numbers D and E to exchange as many private messages as they desire, using only one m-bit public message to transfer each private message. A further advantage of this second modification of the invention is that it is not limited to only two users. User J can send the same secret number E to as many other users as may jointly wish to exchange private messages, using three public messages to send the private message E to each of these other users in the manner diagrammed in FIG. 1. User J and all of the other users then calculate D using their devices of the type in FIG. 5. At this point, User J and all of the other users possess the same secret numbers D and E which they can use to exchange further private messages in the manner just described for Users J and K. The variation of the first modification where R is the secret number also has this advantage of not being limited to two users.

The transfer of a private message from one User to another User by means of an exchange of three public messages according to the invention can be used to accomplish other useful cryptographic tasks. It can, for example, be used to send the same secret key from one User to any number of other Users so that all of these Users could then use this common secret key in a conventional cryptographic system to permit the later exchange of private messages within this group of Users via conventional cryptographic methods. In this mode of employing the invention, the first User, say User J, could send the same public message $Y_1=M^{EJ}$ to all other Users in the selected group, where M is the secret key to be used later in the conventional cryptosystem that all these Users possess. Each of these other Users would respond to the public message $Y_1$, by the same procedure as diagrammed in FIG. 1, but of course the resulting public messages $Y_2$ and $Y_3$ would be different for each of these other Users although the same value $D_J$ would be used by User J in forming his public reply $Y_3=Y_2^{DJ}$ to each of these other Users. This mode of using the invention for the public exchange of a secret key has the advantage over the public key distribution system proposed in the paper "New Directions in Cryptography" by W. Diffie and M. E. Hellman, IEEE Trans. Info. Th., Vol. IT-22, pp. 644–654, Nov. 1976, in that the latter system is not able to provide the same secret key for a group of more than two Users.

Finally it will be noted that it is not intended that the examples and discussion should be taken to limit the applicability of the invention. Various modifications within the spirit and scope of the invention will occur to those skilled in the arts of cryptography and digital logic design.

What is claimed is:

1. An apparatus for maintaining the privacy of a digital message M conveyed by public transmission between a sender and a receiver, and adapted to serve as either a sending station or a receiving station when said sending station and said receiving station are interconnected by two-way public transmission means whose transmissions are subject to unauthorized reception, comprising:
  (a) means for generating a random integer of m binary digits;
  (b) means for computing two integers E and D each between 1 and $2^m-2$ inclusive related such that their product ED equals 1 modulo $2^m-1$, having as an input said random integer; and
  (c) means for exponentiating, having as inputs, an integer N representing E or D, and a non-zero element B of the finite field $GF(2^m)$ containing $2^m$ elements, having m binary digits in normal basis representation, for exponentiating said element B so as to form the element $B^N$ of $GF(2^m)$ having m binary digits in normal basis representation.

2. The apparatus recited in claim 1, wherein said means for exponentiating comprises:
  (a) first means for storing the m binary digits of the element B to be exponentiated in normal basis representation;
  (b) a first means for obtaining in sequence, the $m-1$ successive squares of B in normal basis representation;
  (c) a second means for storing the m binary digits of the integer N representing the exponent in radix-two form;
  (d) a second means for obtaining, in sequence, from lowest to highest order, the m binary digits of the integer N;
  (e) an accumulator for accumulating successive products, whose initial contents are the m binary digits of the element 1 of $GF(2^m)$ in normal basis representation, and which is successively updated with new contents, and whose final contents are the element $B^N$, in normal basis representation;
  (f) a multiplier for $GF(2^m)$ for determining the product vector of m binary digits of two elements of $GF(2^m)$, each represented by a vector of m binary digits in normal basis representation, having as inputs the successive contents of said first means for storing and said accumulator, whereby after at most m successive multiplications, the element $B^N$ of $GF(2^m)$ will be determined;

(g) means for successively updating the contents of said accumulator with said product;

(h) means for feeding the contents of said accumulator to said multiplier; and (i) means for controlling said multiplier whereby said multiplier will be enabled if the low order binary digit of said second means for storing is a logical 1, and disabled if said low order binary digit is a logical 0.

3. The apparatus recited in claim 2 wherein:

(a) said first means for storing comprises an m-bit circulating shift register whose initial contents are the m binary digits of the element B;

(b) said first means for obtaining comprises clocking circuitry for repetitively shifting the m binary digits of the element B in said circulating shift register such that after m shifts, the m−1 successive squares of B will have been formed in normal basis representation;

(c) said second means for storing comprises an m-bit shift register having as the output, the low order binary digit;

(d) said second means for obtaining comprises said clocking circuitry for repetitively shifting the m binary digits of the integer N in said shift register;

(e) said accumulator comprises an m-bit accumulation register;

(f) said means for successively updating comprises a first m-bit latch which transfers said product of said multiplier into said accumulator and further comprises said clocking circuitry which causes said transfer;

(g) said means for feeding comprises a second m-bit latch which transfers the contents of said accumulator to one input of said multiplier and further comprises said clocking circuitry which causes said transfer; and (h) said means for controlling comprises means for coupling the output of said second means for storing to an enable input of said multiplier.

4. The apparatus recited in claim 2 or 3 wherein said multiplier comprises:

(a) means for developing, for each of the two vectors representing an element of $GF(2^m)$, m successive rotated vectors; and (b) logic means including at least one O-M circuit having the m rotated vectors for both elements as inputs, said logic means computing each binary digit of the vector representing the product of said two elements from respective pairs of said vectors using the same O-M logic function.

5. The apparatus recited in claim 4 wherein each of the $2^m$ elements of $GF(2^m)$ is represented by a vector of m binary digits according to a normal basis representation of the form $B = b_{m-1}A^{2m-1} + b_{m-2}A^{2m-2} + \ldots b_2A^2 + b_1A^2 + b_0A$, where B is an element of $GF(2^m)$, $b_{m-1}, b_{m-2}, \ldots b_2, b_1, b_0$ are the binary digits of B, and A is an element of $GF(2^m)$ satisfying the equation $P(X) = 0$ for $X = A$, where $P(X)$ is a polynomial of degree m which is irreducible over the field GF(2) and has linearly independent roots.

6. The apparatus recited in claim 5 wherein:

(a) said means for developing m rotated vectors comprises means to sequentially rotate the binary digits of each vector representing an element to be multiplied in one position increments; and (b) said logic means comprise a single O-M circuit having as inputs the outputs of said means for developing whereby m rotated vectors will be supplied in sequence for each element to said logic means, and said logic means will thereby compute each binary digit of said product vector.

7. The apparatus recited in claim 5 wherein:

(a) said logic means comprise m identical O-M circuits for computing the respective binary digits of said vector representing the product of said two elements; and (b) said means for developing m rotated vectors comprise a plurality of connections to said m identical O-M circuits such that the binary digits of said vectors are coupled as m rotated vectors at the inputs to respective ones of said m identical O-M circuits successively shifted by one position at each successive identical logic circuit.

8. The apparatus recited in claim 1, 2 or 3 wherein said means for exponentiating comprises at least one multiplier for $GF(2^m)$ for determining the element $B^N$ of $GF(2^m)$.

9. The apparatus recited in claim 1,2 or 3 wherein said means for generating produces a random integer R between 1 and $2^m - 1$ inclusive, and wherein said means for computing computes said integers E and D according to the equations $E = H^R$ modulo $2^m - 1$ and $D = H^{-R}$ modulo $2^m - 1$ for a specified integer H, said means for computing comprising:

(a) a first means for storing 2 m m-bit words in 2 m storage locations $j = 0, 1, 2, 3, \ldots 2m - 1$, storage location j of which contains the integer $H^{2j}$ modulo $2^m - 1$ in radix-two form for $j = 0, 1, 2 \ldots m - 1$ and $H^{-2j-m}$ modulo $2^m - 1$ in radix-two form for $j = m, m+1 \ldots 2m - 1$, where H is an integer between 2 and $2^m - 2$ inclusive;

(b) a first means for obtaining, in sequence, each of said 2 m m-bit words;

(c) a second means for storing said random integer R having m binary digits;

(d) a second means for obtaining, in two identical sequences, from lowest to highest order, the m binary digits of said integer R;

(e) an accumulator for accumulating successive products, whose initial contents are the m binary digits of the integer 1 in radix-two form and whose contents after the m binary digits of the integer R have once been obtained are the binary digits of said integer E, and after the m binary digits of the integer R have twice been obtained are the m binary digits of said integer D;

(f) a 1's complement multiplier which successively determines the 1's complement product of two integers of m binary digits having as a first input, the successive contents of said first means for storing, and as a second input, the successive contents of said accumulator, whereby after at most m multiplications, said integer E will have been determined, and after at most 2 m multiplications, said integer D will have been determined;

(g) means for successively updating the contents of said accumulator with said 1's complement product;

(h) means for feeding the contents of said accumulator to said 1's complement multiplier; and (i) means for controlling said 1's complement multiplier whereby said 1's complement multiplier will be enabled if the low order binary digit of said second memory is a logical 1, and disabled if said low order binary digit is a logical 0.

10. The apparatus recited in claim 9 wherein:
(a) said first means for storing comprises a read-only memory (ROM);
(b) said first means for obtaining comprises:
  (i) clocking circuitry which operates at rate X Hz; and
  (ii) a 2 m state counter which selects, in sequence, for each cycle of said clocking circuitry, one of said 2 m storage locations;
(c) said second means for storing comprises an m-bit circulating shift register having as the output, the low order binary digit;
(d) said second means for obtaining comprises said clocking circuitry for repetitively shifting the m binary digits of the integer R in said circulating shift register;
(e) said accumulator comprises an m-bit accumulation register;
(f) said means for successively updating comprises a first m-bit latch which transfers the 1's complement product of said 1's complement multiplier into said accumulator and further comprises said clocking circuitry which causes said transfer;
(g) said means for feeding comprises a second m-bit latch which transfers the contents of said accumulator to said 1's complement multiplier and further comprises said clocking circuitry which causes said transfer; and
(h) said means for controlling comprises means for coupling the output of said second means for storing to an enable input of said 1's complement multiplier.

11. The apparatus recited in claim 1,2 or 3 wherein m is an integer such that $2^m-1$ is a prime number.

12. The apparatus recited in claim 9 wherein m is an integer such that $p=2^m-1$ is a prime number and the integer H is a primitive element of GF(p).

13. The apparatus recited in claim 1, 2 or 3 when m is an integer such that $2^m-1$ is a prime number wherein said means for generating produces said m-bit integer E as a randomly selected integer between 1 and $2^m-2$ inclusive, and said computer produces the integer D from the randomly selected integer E, where DE=1 modulo $2^m-1$, said means for computing comprising:
(a) an m-bit 1's complement multiplier which performs 2 m—3 successive multiplications, having a first and second m-bit input an m-bit output, resulting in 2 m—3 successive m-bit products;
(b) a first accumulator whose initial contents are the m-bits of the random integer E in radix-two form, and which is successively updated, and the output of which connects to said first input of said m-bit 1's complement multiplier;
(c) a second accumulator whose initial contents are the m-bits of the random integer E, and which is successively updated, and whose final contents are the m bits of the integer D;
(d) means for successively updating the contents of said first and second accumulators, whereby after the first multiplication said first product will be fed into said first accumulator, and thereafter, each successive product will be fed alternately into the first and second accumulator respectively; and
(e) means for coupling said first and second accumulators to said second m-bit input of said m-bit 1's complement multiplier whereby after the first multiplication, said first accumulator is coupled to said second m-bit input, and thereafter, said first and second accumulators respectively will be alternately coupled to said second m-bit input.

14. The apparatus recited in claim 13 wherein:
(a) said first accumulator comprises an m-bit accumulation register;
(b) said second accumulator comprises an m-bit accumulation register;
(c) said means for successively updating comprises:
  (i) an m-bit switch having m switches with m ciommon inputs, one per switch, and first and second outputs for each of said m switches, and m common inputs respectively connecting to the m-bit output of said m-bit 1's complement multiplier, said first outputs connecting to said first accumulator, and said second outputs connecting to said second accumulator;
  (ii) clocking circuitry whereby said m-bit switch selects the first outputs during the first cycle of said clocking circuitry, and thereafter, alternately the first and second outputs respectively;
  (iii) a disable input to said m-bit switch whereby said switch will not select alternate outputs between the first and second cycles of said clocking circuitry, but will after the second cycle and thereafter;
(d) said means for coupling comprises:
  (i) an m-bit switch having m switches with first and second inputs and m common outputs, one per switch, said m first inputs connecting to said first accumulator, and said m second inputs connecting to said second accumulator, said m common outputs connecting to said second input of said m-bit 1's complement multiplier;
  (ii) clocking circuitry whereby said m-bit switch selects the first inputs during the first cycle of said clocking circuitry, and thereafter alternately, the first and second inputs respectively;
  (iii) a disable input to said m-bit switch whereby said switch will not select alternate inputs between the first and second cycles of said clocking circuitry, but will after the second cycle and thereafter.

15. The apparatus recited in claim 1, 2 or 3 wherein said means for exponentiating further comprises clocking circuitry operating at the rate of X Hz, and wherein said means for generating comprises an m-stage maximal-length linear feedback shift register with arbitrary non-zero initial contents and further comprises clocking circuitry operating at a rate >X Hz, which shifts said contents of said maximal-length linear feedback shift register.

16. An exponentiator which produces the element $B^N$ of the finite field $GF(2^m)$ containing $2^m$ elements in normal basis representation when presented with a non zero element B of $GF(2^m)$ of m binary digits, and with an integer N between 1 and $2^m-2$ inclusive of m binary digits to serve as the exponent, comprising:
(a) a first means for storing the m binary digits of said element B to be exponentiated in normal basis representation;

(b) a first means for obtaining in sequence, the $m-1$ successive squares of B in normal basis representation;

(c) a second means for storing the m binary digits of the integer N representing the exponent in radix-two form;

(d) a second means for obtaining, in sequence, from lowest to highest order, the m binary digits of the integer N;

(e) an accumulator for accumulating successive products whose initial contents are the element 1 of $GF(2^m)$ in normal basis representation and which is successively updated with new contents, and whose final contents are the element $B^N$ in normal basis representation;

(f) a multiplier for $GF(2^m)$ for determining the product vector of m binary digits of two elements of $GF(2^m)$, each represented by a vector of m binary digits in normal basis representation, having as inputs the successive contents of said first means for storing and said accumulator, whereby after at most m successive multiplications, the element $B^N$ of $GF(2^m)$ will be determined;

(g) means for successively updating the contents of said accumulator with said product;

(h) means for feeding the contents of said accumulator to said multiplier; and (i) means for controlling said multiplier whereby said multiplier will be enabled if the low order binary digit of said second memory is a logical 1, and disabled if said low order binary digit is a logical 0.

17. The exponentiator recited in claim 16 wherein:

(a) said first means for storing comprises an m-bit circulating shift register whose intital contents are the m binary digits of the element B;

(b) said first means for obtaining comprises clocking circuitry which operate at rate X Hz, for repetitively shifting the m binary digits of the element B in said circulating shift register such that after m shifts, the $m-1$ successive squares of B will have been formed in normal basis representation;

(c) said second means for storing comprises an m-bit shift register having as the output, the low order binary digit;

(d) said second means for obtaining comprises said clocking circuitry for repetitively shifting the m binary digits of the integer N in said shift register;

(e) said accumulator comprises an m-bit accumulation register;

(f) said means for successively updating comprises a first m-bit latch which transfers said product of said multiplier into said accumulator and further comprises said clocking circuitry which causes said transfer;

(g) said means for feeding comprises a second m-bit latch which transfers the contents of said accumulator to one input of said multiplier and further comprises said clocking circuitry which causes said transfer; and (h) said means for controlling comprises means for coupling the output of said second means for storing to an enable input of said multiplier.

18. The exponentiator recited in claim 16 or 17 wherein each of the $2^m$ elements of $GF(2^m)$ is represented by a vector of m binary digits according to a normal basis representation of the form $B = b_{m-1}A^{2m-1} + b_{m-2}A^{2m-2} + \ldots b_2A^4 + b_1A^2 + b_0A$, where B is an element of $GF(2^m)$, $b_{m-1}, b_{m-2}, \ldots b_2, b_1, b_0$ are the binary digits of B, and A is an element of $GF(2^m)$ satisfying the equation $P(X) = 0$ for $X = A$, where $P(X)$ is a polynomial of degree m which is irreducible over the field $GF(2)$ and has linearly independent roots.

19. An apparatus for computing a pair of integers E and D each having m binary digits and each between 1 and $2^m - 2$ inclusive according to the equations $E = H^R$ modulo $2^m - 1$ for a specified integer H and $ED = 1$ modulo $2^m - 1$, when presented with a random integer R of m binary digits between 1 and $2^m - 1$ inclusive, comprising:

(a) a first means for storing 2 m m-bit words in 2 m storage locations $j = 0, 1, 2, 3 \ldots 2m - 1$, storage location j of which contains the integer $H^{2j}$ modulo $2^m - 1$ in radix-two form for $j = 0, 1, 2 \ldots m - 1$, and $H^{-2j-m}$ modulo $2^m - 1$ in radix-two form for $j = m, m+1 \ldots 2m - 1$, where H is an integer between 2 and $2^m - 2$ inclusive;

(b) a first means for obtaining, in sequence, each of said 2 m m-bit words;

(c) a second means for storing said random integer R having m binary digits;

(d) a second means for obtaining, in two identical sequences, from lowest to highest order, the m binary digits of said integer R;

(e) an accumulator for accumulating successive products, whose initial contents are the m binary digits of the integer 1 in radix-two form and whose contents after the m binary digits of the integer R have once been obtained are the m binary digits of said integer E, and after the m binary digits of the integer R have twice been obtained are the m binary digits of said integer D;

(f) a 1's compliment multiplier for determining the 1's complement product of two integers of m binary digits having as a first input, the successive contents of said first means for storing, and as a second input, the successive contents of said accumulator, whereby after at most m multiplications, said integer E will have been determined, and after at most 2 m multiplications, said integer D will have been determined;

(g) means for successively updating the contents of said accumulator with said 1's complement product;

(h) means for feeding the contents of said accumulator to said 1's complement multiplier;

(i) means for controlling said 1's complement multiplier whereby said 1's complement multiplier will be enabled if the low order binary digit of said second means for storing is a logical 1, and disabled if said low order binary digit is a logical 0.

20. The apparatus recited in claim 19 wherein:

(a) said first means for storing comprises a read-only memory (ROM);

(b) said first means for obtaining comprises:
   (i) clocking circuitry which operates at rate X Hz; and
   (ii) a 2 m state counter which selects, in sequence, for each cycle of said clocking circuitry, one of said 2 m storage locations;

(c) said second means for storing comprises an m-bit circulating shift register having as the output, the low order binary digit;

(d) said second means for obtaining comprises said clocking circuitry for repetitively shifting the m binary digits of the integer R in said circulating shift register;

(e) said accumulator comprises an m-bit accumulation register;

(f) said means for successively updating comprises a first m-bit latch which transfers the 1's complement product of said 1's complement multiplier into said accumulator and further comprises said clocking circuitry which causes said transfer;

(g) said means for feeding comprises a second m-bit latch which transfers the contents of said accumulator to said 1's complement multiplier and further comprises said clocking circuitry which causes said transfer; and (h) said means for controlling comprises means for coupling the output of said second means for storing to an enable input of said 1's complement multiplier.

21. An apparatus for computing an m-bit integer D from a randomly selected m-bit integer E, where both E and D are between 1 and $2^m-2$ inclusive, and are related such that ED equals 1 modulo $2^m-1$, comprising:

(a) an m-bit 1's complement multiplier which performs $2m-3$ successive multiplications, having a first and second m-bit input and an m-bit output, resulting in $2m-3$ successive m-bit products;

(b) a first accumulator whose initial contents are the m-bits of the random integer E in radix-two form and which is successively updated and the output of which connects to said first input of said m-bit 1's complement multiplier;

(c) a second accumulator whose initial contents are the m-bits of the random integer E, and which is successively updated, and whose final contents are the m bits of the integer D;

(d) means for successively updating the contents of said first and second accumulators, whereby after the first multiplication said first product will be fed into said first accumulator, and thereafter, each successive product will be fed alternately into the first and second accumulators respectively; and (e) means for coupling said first and second accumulators to said second m-bit input of said m-bit 1's complement multiplier whereby after the first multiplication, said first accumulator is coupled to said second m-bit input, and thereafer, said first and second accumulators respectively will be alternately coupled to said second m-bit input.

22. The apparatus recited in claim 21 wherein:

(a) said first accumulator comprises an m-bit accumulation register;

(b) said second accumulator comprises an m-bit accumulation register;

(c) said means for successively updating comprises:
  (i) an m-bit switch having m switches with m common inputs, one per switch, and first and second outputs for each of said m switches, said m common inputs respectively connecting to the m-bit output of said first accumulator, and said second outputs connecting to second accumulator;
  (ii) clocking circuitry whereby said m-bit switch selects the first outputs during the first cycle of said clocking circuitry, and thereafter, alternately the first and second outputs respectively;
  (iii) a disable input to said m-bit switch whereby said switch will not select alternate outputs between the first and second cycles of said clocking circuitry, but will after the second cycle and thereafter;

(d) said means for coupling comprises:
  (i) an m-bit switch having m switches with first and second inputs and m common outputs, one per switch, said m first inputs connecting to said first accumulator, and said m second inputs connecting to said second accumulator, said m common outputs connecting to said second input of said m-bit 1's complement multiplier;
  (ii) clocking circuitry whereby said m-bit switch selects the first inputs during the first cycle of said clocking circuitry, and thereafter alternately, the first and second inputs respectively;
  (iii) a disable input to said m-bit switch whereby said switching means will not select alternate inputs between the first and second cycles of said clocking circuitry, but will after the second cycle and thereafter.

23. The method for maintaining the privacy of a digital message M conveyed by public transmission between a sender and a receiver wherein private transmission of said digital message M requires the actual transmission of a first public digital message $Y_1$, a second public digital message $Y_2$ and a third public digital message $Y_3$ for each private digital message M over public transmission means, said private digital message M and said three public digital messages $Y_1$, $Y_2$ and $Y_3$ each represented by a vector of m binary digits where m is an integer equal to or greater than 2, and each normal basis representations of an element of the finite field $GF(2^m)$ containing $2^m$ elements other than the elements 0 and 1 of said finite field, said three public messages $Y_1$, $Y_2$ and $Y_3$ being the elements of $GF(2^m)$ determined by the equations $$Y_1 = M^{E_1}$$

$$Y_2 = Y_1^{E_2}$$

$$Y_3 = Y_2^{D_1}$$

and said private message M being determined by $M = Y_3^{D_2}$, where $E_1$, $D_1$, $E_2$ and $D_2$ are each integers of m binary digits between 1 and $2^m-2$ inclusive whose products $E_1 D_1 = E_2 D_2 = 1$ modulo $2^m-1$, said first public message $Y_1$ being transmitted from said sending station to said receiving station, said second public message $Y_2$ being transmitted as the reply from said receiving station to said sending station, and said third public message $Y_3$ being transmitted as the reply to said message $Y_2$ from said sending station to said receiving station, said receiving station then calculating said private message M according to the equation $M = Y_3^{D_2}$, comprising the steps of:

(a) generating in random integer generating means at said sending station a first random integer of m binary digits;

(b) computing in means for computing at said sending station a pair of integers $E_1$ and $D_1$ each between 1 and $2^m-2$ inclusive, and each of m binary digits such that their product $E_1 D_1$ equals 1 modulo $2^m-1$ when presented with said first random integer;

(c) exponentiating in means for exponentiating at said sending station said private message M to the $E_1$ power to obtain said public message $Y_1$;

(d) transmitting said message $Y_1$ over said public transmission means to said receiving station;

(e) generating in random integer generating means at said receiving station a second random integer of m binary digits;

(f) computing in means for computing at said receiving station a pair of integers $E_2$ and $D_2$ each between 1 and $2^m-2$ inclusive and each of m binary digits such that their product $E_2D_2$ equals 1 modulo $2^m-1$ when presented with said second random integer;

(g) exponentiating in means for exponentiating at said receiving station said public message $Y_1$ to the $E_2$ power to obtain said public message $Y_2$;

(h) transmitting said message $Y_2$ over said public transmission means to said sending station;

(i) exponentiating in said means for exponentiating at said sending station said public message $Y_2$ to the $D_1$ power to obtain said public message $Y_3$;

(j) transmitting said public message $Y_3$ over said public transmission means to said receiving station; and (k) exponentiating in said means for exponentiating at said receiving station said public message $Y_3$ to the $D_2$ power to obtain said private message M.

24. The method recited in claim 23 for the effective sending and receiving of further private messages $M_i'$ and $M_i''$ by the transmission of further public messages $Y_i'$ and $Y_i''$, for $i=0$ to $\infty$, after said private message M is transmitted by the exchange of said three public messages, where said private message M is the m-bit radix-two form of an integer $D_1$ between 1 and $2^m-2$ inclusive, and $E_1$ is a second m-bit integer in radix two form between 1 and $2^m-2$ inclusive such that $E_1D_1=1$ modulo $2^m-1$, where $E_1$ and $D_1$ are computed in said means for computing at said sending station, said further private and public messages each containing m binary digits in normal basis representation and representing elements of the finite field $GF(2^m)$ other than the elements 0 and 1, wherein any of said further private messages $M_i'$ are transmitted by the actual transmission of the public message $Y_i'$ for each private message $M_i'$, where $Y_i'=(M_i')^{E_1}$, said message $Y_i'$ being computed in said means for exponentiating at said sending station, and said message $M_i'$ being obtained by said means for exponentiating at said receiving station according to the equation $M_i'=(Y_i')^{D_1}$, and wherein any of said further private messages $M_i''$ are transmitted from said receiving station to said sending station by the actual transmission of one public message $Y_i''$ for each private message $M_i''$, where $Y_i''=(M_i'')^{D_1}$, said message $Y_i''$ being computed in said means for exponentiating at said receiving station, and said message $M_i''$ being obtained by said means for exponentiating at said sending station according to the equation $M_i''=(Y_i'')^{E_1}$.

25. The method recited in claim 24 where there is at least one receiving station, wherein said private message M is the m-bit radix two form of a randomly selected integer R between 1 and $2^m-2$ inclusive generated in said random integer generating means at said sending station, and said means for computing at said receiving station computes said integer $D_1$ from said integer R according to the equation $D_1=H^{-R}$ for a specified integer H, whereby said message $M_i'=(Y_i')^{D_1}$ may be obtained at said receiving station, and said message $Y_i''=(M_i'')^{D_1}$ may be transmitted to said sending station from said receiving station.

26. The method recited in claim 23, where there is at least one receiving station, for the effective sending of further private messages $M_i'$, for $i=0$ to $\infty$ between any of said stations by the sending of one public message $Y_i'$ for $i=0$ to $\infty$, for each further private message $M_i'$ after the exchange of said three public messages, wherein said private message M is the m-bit radix two form of said integer $E_1$ between 1 and $2^m-2$ inclusive, said integer $E_1$ having been generated in said random integer generating means at said sending station, whereby said means for computing at said sending station and at said receiving station compute said integer $D_1$ between 1 and $2^m-2$ inclusive such that $E_1D_1=1$ modulo $2^m-1$, said further private and public messages each containing m binary digits in normal basis representation and representing an element of the finite field $GF(2^m)$ other than the elements 0 and 1, and wherein said further private message $M_i'$ is sent from one of said stations to the others of said stations by the actual transmission of said public message $Y_i'$, where $Y_i'=(M_i')^{E_1}$ is computed in said means for exponentiating at said sending station, and said message $M_i'$ is obtained by said means for exponentiating at said receiving station according to the equation $M_i'=(Y_i')^{D_1}$.

* * * * *

UNITED STATES PATENT AND TRADEMARK OFFICE
CERTIFICATE OF CORRECTION

PATENT NO. : 4,567,600

DATED : Jan. 28, 1986

INVENTOR(S) : James L. Massey; Jimmy K. Omura

It is certified that error appears in the above-identified patent and that said Letters Patent is hereby corrected as shown below:

Col. 6, line 4, delete "x" and insert therefor --=--.

Col. 6, line 46, the equation should read:--$E_K = \log_{Y_1}(Y_2)$--

Col. 9, line 30, change "present" to --preset--.

Col. 10, line 36, change "componets" to --components--.

Col. 10, line 37, change "that" to --then--.

Col. 10, line 50, change "expoentiation" to --exponentiation--.

Col. 13, line 18, change "is" to --in--.

Col. 15, line 41, change "has" to --his--.

Col. 17, line 21, change "alteration" to --alternation--.

Col. 18, line 46, after "(28)", delete "Ps".

Col. 18, line 67, change equation (33) to read:

--$D = E^{P-2} = E^{2^m - 3} \pmod{2^m - 1}$--

Col. 19, line 1, after "($2^{m-1}$", insert --+--.

Col. 26, lines 16 and 17, change "ciommon" to --common--.

UNITED STATES PATENT AND TRADEMARK OFFICE
CERTIFICATE OF CORRECTION

PATENT NO. : 4,567,600            Page 2 of 2

DATED : Jan. 28, 1986

INVENTOR(S) : James L. Massey; Jimmy K. Omura

It is certified that error appears in the above-identified patent and that said Letters Patent is hereby corrected as shown below:

Col. 26, line 18, change "and" to --said--.

Col. 28, line 36, change "complment" to --complement--.

Col. 32, line 44, equation should read: $--M_i'=(Y_i')^{D_1}--$.

Signed and Sealed this

Twenty-seventh Day of May 1986

[SEAL]

Attest:

DONALD J. QUIGG

Attesting Officer      Commissioner of Patents and Trademarks